US011409396B1

(12) United States Patent
Hoch

(10) Patent No.: US 11,409,396 B1
(45) Date of Patent: Aug. 9, 2022

(54) TRANSCAPACITIVE SENSING WITH CONSIDERATION OF CAPACITIVE COUPLINGS FROM NON-ADJACENT ELECTRODES

(71) Applicant: Synaptics Incorporated, San Jose, CA (US)

(72) Inventor: David Hoch, Hickory, NC (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/306,432

(22) Filed: May 3, 2021

(51) Int. Cl.
*G06F 3/044* (2006.01)
*G06F 3/041* (2006.01)

(52) U.S. Cl.
CPC ........ *G06F 3/0445* (2019.05); *G06F 3/04166* (2019.05); *G06F 2203/04108* (2013.01)

(58) Field of Classification Search
CPC .............. G06F 3/0445; G06F 3/04166; G06F 2203/04108
See application file for complete search history.

(56) References Cited

U.S. PATENT DOCUMENTS

| 10,788,939 | B2 | 9/2020 | Goudarzi et al. | |
| 2016/0103525 | A1* | 4/2016 | Snelgrove | G06F 3/0446 345/174 |
| 2019/0265857 | A1* | 8/2019 | Chou | G06F 3/04164 |
| 2020/0133409 | A1* | 4/2020 | Tanemura | G06F 3/0443 |
| 2020/0387248 | A1* | 12/2020 | Kim | G06F 3/044 |

\* cited by examiner

*Primary Examiner* — Liliana Cerullo
(74) *Attorney, Agent, or Firm* — Leydig, Voit & Mayer, Ltd.

(57) ABSTRACT

A method for capacitive sensing includes: driving, by a processing system, a first plurality of transmitter electrodes using a first plurality of basis functions, wherein the first plurality of transmitter electrodes are part of a first set of non-intersecting electrodes which are arranged adjacently to one another in a first orientation; and obtaining, by the processing system, via a first plurality of receiver electrodes of the first set of non-intersecting electrodes, a first plurality of resulting signals corresponding to the first plurality of basis functions driven onto the first plurality of transmitter electrodes. The first plurality of resulting signals includes: capacitance information for nearest-neighbor pairs of electrodes of the first set of non-intersecting electrodes; capacitance information for second nearest-neighbor pairs of electrodes of the first set of non-intersecting electrodes; and/or capacitance information for third nearest-neighbor pairs of electrodes of the first set of non-intersecting electrodes.

20 Claims, 13 Drawing Sheets

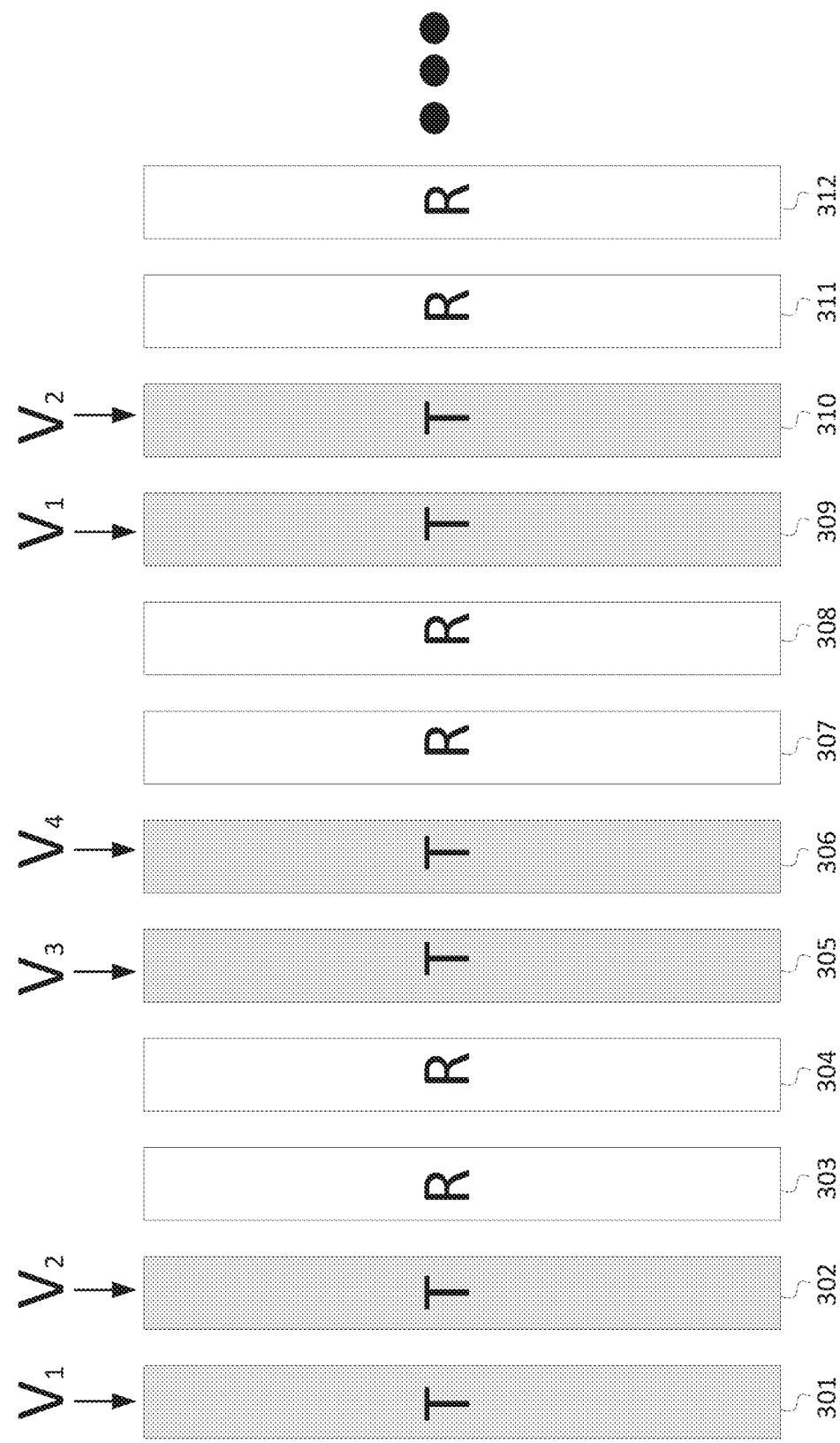

TRANSCAPACITIVE SENSING WITH CONSIDERATION OF CAPACITIVE COUPLINGS FROM NON-ADJACENT ELECTRODES

TECHNICAL FIELD

The described embodiments relate generally to electronic devices, and more specifically, to capacitive sensors.

BACKGROUND

Input devices, including capacitive sensor devices (e.g., touchpads or touch sensor devices), are widely used in a variety of electronic systems. A capacitive sensor device may include a sensing region, often demarked by a surface, in which the capacitive sensor device determines the presence, location and/or motion of one or more input objects. Capacitive sensor devices may be used to provide interfaces for the electronic system. For example, capacitive sensor devices may be used as input devices for larger computing systems (e.g., opaque touchpads integrated in, or peripheral to, notebook or desktop computers). Capacitive sensor devices are also often used in smaller computing systems (e.g., touch screens integrated in cellular phones). Capacitive sensor devices may also be used to detect input objects (e.g., finger, styli, pens, fingerprints, etc.).

Capacitive sensor devices as used in touch sensing applications are able to detect position, movement, and/or features of an input object contacting a sensing surface. It would be desirable to use capacitive sensor devices for proximity sensing in addition to touch sensing—i.e., in situations where the input object is proximate to the sensing surface but not in contact with the sensing surface (e.g., when the input object is up to 2.5 cm away from the sensing surface). However, conventional absolute capacitance systems are not well-suited for such proximity sensing due to high background couplings, and conventional transcapacitive systems are also not well-suited for such proximity sensing due to low signal-to-noise ratio (SNR).

SUMMARY

In an exemplary embodiment, the present application provides a method for capacitive sensing. The method includes: driving, by a processing system, a first plurality of transmitter electrodes using a first plurality of basis functions, wherein the first plurality of transmitter electrodes are part of a first set of non-intersecting electrodes which are arranged adjacently to one another in a first orientation; and obtaining, by the processing system, via a first plurality of receiver electrodes of the first set of non-intersecting electrodes, a first plurality of resulting signals corresponding to the first plurality of basis functions driven onto the first plurality of transmitter electrodes. The first plurality of resulting signals includes capacitance information for pairs of electrodes of the first set of non-intersecting electrodes, wherein the capacitance information includes at least one of: capacitance information for nearest-neighbor pairs of electrodes of the first set of non-intersecting electrodes; capacitance information for second nearest-neighbor pairs of electrodes of the first set of non-intersecting electrodes; or capacitance information for third nearest-neighbor pairs of electrodes of the first set of non-intersecting electrodes.

In a further exemplary embodiment, the method further includes: driving, by the processing system, a second plurality of transmitter electrodes of the first set of non-intersecting electrodes using a second plurality of basis functions; and obtaining, by the processing system, via a second plurality of receiver electrodes of the first set of non-intersecting electrodes, a second plurality of resulting signals corresponding to the second plurality of basis functions driven onto the second plurality of transmitter electrodes. The second plurality of resulting signals include additional capacitance information for additional pairs of electrodes of the first set of non-intersecting electrodes which was not obtained via the first plurality of resulting signals.

In a further exemplary embodiment, the second plurality of basis functions is the same as the first plurality of basis functions.

In a further exemplary embodiment, the first plurality of resulting signals and the second plurality of resulting signal include at least two of the following: capacitance information for all nearest-neighbor pairs of electrodes of the first set of non-intersecting electrodes; capacitance information for all second nearest-neighbor pairs of electrodes of the first set of non-intersecting electrodes; or capacitance information for all third nearest-neighbor pairs of electrodes of the first set of non-intersecting electrodes.

In a further exemplary embodiment, electrodes of the first set of non-intersecting electrodes are parallel to one another.

In a further exemplary embodiment, the first plurality of basis functions are Walsh-Hadamard basis functions.

In a further exemplary embodiment, the method further includes: driving, by the processing system, a first plurality of transmitter electrodes of a second set of non-intersecting electrodes using a second plurality of basis functions, wherein the second set of non-intersecting electrodes are arranged adjacently to one another in a second orientation; and obtaining, by the processing system, via a first plurality of receiver electrodes of the second set of non-intersecting electrodes, a second plurality of resulting signals corresponding to the second plurality of basis functions driven onto the first plurality of transmitter electrodes of the second set of non-intersecting electrodes. The second plurality of resulting signals includes capacitance information for pairs of electrodes of the second set of non-intersecting electrodes, including at least one of: capacitance information for nearest-neighbor pairs of electrodes of the first set of non-intersecting electrodes; capacitance information for second nearest-neighbor pairs of electrodes of the first set of non-intersecting electrodes; or capacitance information for third nearest-neighbor pairs of electrodes of the first set of non-intersecting electrodes.

In another exemplary embodiment, the present application provides a device for capacitive sensing. The device includes: a plurality of electrodes, including a first set of non-intersecting electrodes which are arranged adjacently to one another in a first orientation; and a processing system, configured to: drive a first plurality of transmitter electrodes of the first set of non-intersecting electrodes using a first plurality of basis functions; and obtain, via a first plurality of receiver electrodes of the first set of non-intersecting electrodes, a first plurality of resulting signals corresponding to the first plurality of basis functions driven onto the first plurality of transmitter electrodes. The first plurality of resulting signals includes capacitance information for pairs of electrodes of the first set of non-intersecting electrodes, wherein the capacitance information includes at least one of: capacitance information for nearest-neighbor pairs of electrodes of the first set of non-intersecting electrodes; capacitance information for second nearest-neighbor pairs of electrodes of the first set of non-intersecting electrodes; or capacitance information for third nearest-neighbor pairs of electrodes of the first set of non-intersecting electrodes.

In a further exemplary embodiment, the processing system is further configured to: drive a second plurality of transmitter electrodes of the first set of non-intersecting electrodes using a second plurality of basis functions; and obtain, via a second plurality of receiver electrodes of the first set of non-intersecting electrodes, a second plurality of resulting signals corresponding to the second plurality of basis functions driven onto the second plurality of transmitter electrodes, wherein the second plurality of resulting signals include additional capacitance information for additional pairs of electrodes of the first set of non-intersecting electrodes which was not obtained via the first plurality of resulting signals.

In a further exemplary embodiment, the second plurality of basis functions is the same as the first plurality of basis functions.

In a further exemplary embodiment, the first plurality of resulting signals and the second plurality of resulting signal include at least two of the following: capacitance information for all nearest-neighbor pairs of electrodes of the first set of non-intersecting electrodes; capacitance information for all second nearest-neighbor pairs of electrodes of the first set of non-intersecting electrodes; or capacitance information for all third nearest-neighbor pairs of electrodes of the first set of non-intersecting electrodes.

In a further exemplary embodiment, electrodes of the first set of non-intersecting electrodes are parallel to one another.

In a further exemplary embodiment, the first plurality of basis functions are Walsh-Hadamard basis functions.

In a further exemplary embodiment, the device further comprises a second set of non-intersecting electrodes arranged adjacently to one another in a second orientation; and the processing system is further configured to: drive a first plurality of transmitter electrodes of the second set of non-intersecting electrodes using a second plurality of basis functions; and obtain, via a first plurality of receiver electrodes of the second set of non-intersecting electrodes, a second plurality of resulting signals corresponding to the second plurality of basis functions driven onto the first plurality of transmitter electrodes of the second set of non-intersecting electrodes. The second plurality of resulting signals includes capacitance information for pairs of electrodes of the second set of non-intersecting electrodes, including at least one of: capacitance information for nearest-neighbor pairs of electrodes of the first set of electrodes; capacitance information for second nearest-neighbor pairs of electrodes of the first set of electrodes; or capacitance information for third nearest-neighbor pairs of electrodes of the first set of electrodes.

In yet another exemplary embodiment, the present application provides a non-transitory computer-readable medium having processor-executable instructions stored thereon for capacitive sensing. The processor-executable instructions, when executed, facilitate: driving a first plurality of transmitter electrodes using a first plurality of basis functions, wherein the first plurality of transmitter electrodes are part of a first set of non-intersecting electrodes which are arranged adjacently to one another in a first orientation; and obtaining, via a first plurality of receiver electrodes of the first set of non-intersecting electrodes, a first plurality of resulting signals corresponding to the first plurality of basis functions driven onto the first plurality of transmitter electrodes. The first plurality of resulting signals includes capacitance information for pairs of electrodes of the first set of non-intersecting electrodes, wherein the capacitance information includes at least one of: capacitance information for nearest-neighbor pairs of electrodes of the first set of electrodes; capacitance information for second nearest-neighbor pairs of electrodes of the first set of electrodes; or capacitance information for third nearest-neighbor pairs of electrodes of the first set of electrodes.

In a further exemplary embodiment, the processor-executable instructions, when executed, further facilitate: driving a second plurality of transmitter electrodes of the first set of non-intersecting electrodes using a second plurality of basis functions; and obtaining, via a second plurality of receiver electrodes of the first set of non-intersecting electrodes, a second plurality of resulting signals corresponding to the second plurality of basis functions driven onto the second plurality of transmitter electrodes, wherein the second plurality of resulting signals include additional capacitance information for additional pairs of electrodes of the first set of non-intersecting electrodes which was not obtained via the first plurality of resulting signals.

In a further exemplary embodiment, the second plurality of basis functions is the same as the first plurality of basis functions.

In a further exemplary embodiment, the first plurality of resulting signals and the second plurality of resulting signal include at least two of the following: capacitance information for all nearest-neighbor pairs of electrodes of the first set of non-intersecting electrodes; capacitance information for all second nearest-neighbor pairs of electrodes of the first set of non-intersecting electrodes; or capacitance information for all third nearest-neighbor pairs of electrodes of the first set of non-intersecting electrodes.

In a further exemplary embodiment, electrodes of the first set of non-intersecting electrodes are parallel to one another.

In a further exemplary embodiment, the first plurality of basis functions are Walsh-Hadamard basis functions.

BRIEF DESCRIPTION OF DRAWINGS

FIGS. 4A-4E depict driving schemes for a set of electrodes in accordance with other exemplary embodiments of the present disclosure.

DETAILED DESCRIPTION

Figure 1:
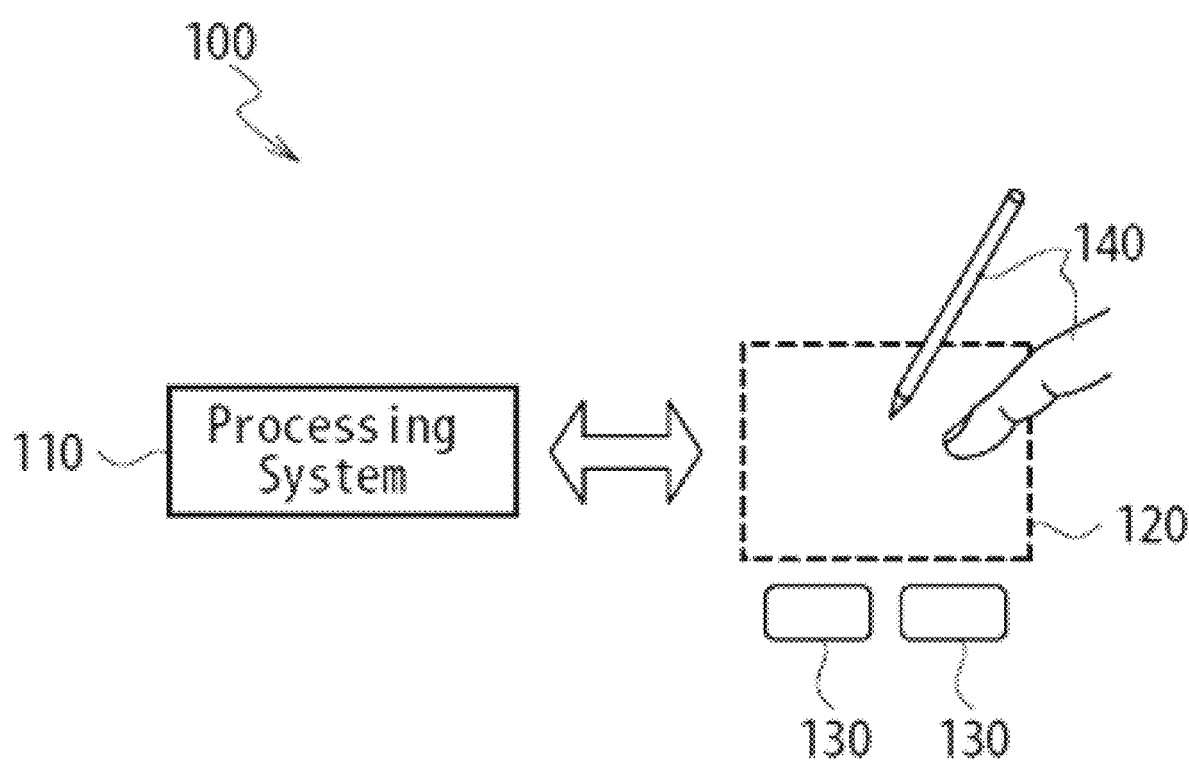
FIG. 1 depicts a schematic block diagram of an exemplary input device.

The drawings and the following detailed description are merely exemplary in nature, and are not intended to limit the disclosed technology or the application and uses of the disclosed technology. Furthermore, there is no intention to be bound by any expressed or implied theory presented in the preceding technical field, background, or the following detailed description.

In the following detailed description of exemplary embodiments, numerous details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The following description of sensor patterns relies on terminology such as "horizontal", "vertical", "top", "bottom", and "under" to clearly describe certain geometric features of the sensor patterns. The use of these terms is not intended to introduce a limiting directionality. For example, the geometric features may be rotated to any degree, without departing from the disclosure. Further, while patterns of certain sizes are shown in the drawings, the patterns may extend and/or repeat without departing from the disclosure. For example, the use of the term columns and vertical direction is to distinguish between rows and the horizontal direction, respectively. If the input device is rectangular, any direction along the surface may be designated as the vertical direction by which a column extends and any substantially orthogonal direction along the surface may be designated as a vertical direction along which the row extends.

Exemplary embodiments of the present disclosure provide input devices and methods for both touch and proximity sensing through transcapacitive sensing using a plurality of non-intersecting electrodes which are adjacent to one other, such as a plurality of parallel electrodes spanning a sensing region. By driving certain electrodes as transmitter electrodes using basis functions according to certain sequences of driving patterns in accordance with the exemplary embodiments, it becomes possible to distinguish between the capacitive couplings between adjacent electrodes and the capacitive couplings between non-adjacent electrodes (such as between a first electrode and its second nearest neighbor and between the first electrode and its third nearest neighbor). With a suitable driving pattern, this can provide for an increased SNR which may even be sufficiently high for accurate proximity sensing through the use of transcapacitive sensing. Exemplary embodiments of the disclosure are also usable for applications other than touch and proximity sensing, such as moisture sensing and low ground mass (LGM) correction. In some embodiments, the transcapacitive sensing between adjacent electrodes provides profiles of the two axes of the sensor and can be viewed as an alternative measurement to absolute sensing.

An example input device 100 as shown in FIG. 1 in accordance with embodiments of the disclosure may be configured to provide input to an electronic system. As used in this document, the term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices, e.g., remote controllers and mice, and data output devices, e.g., display screens and printers. Other examples include remote terminals, kiosks, and video game machines, e.g., video game consoles, portable gaming devices, and the like. Other examples include communication devices, e.g., cellular phones such as smart phones, and media devices, e.g., recorders, editors, and players such as televisions, set-top boxes, music players, digital photo frames, and digital cameras. Additionally, the electronic system could be a host or a slave to the input device. The electronic system may also be referred to as electronic device.

The input device 100 can be implemented as a physical part of the electronic system, or can be physically separate from the electronic system. In one embodiment, the electronic system may be referred to as a host device. As appropriate, the input device 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device 100 is shown as a capacitive sensor device configured to sense input provided by one or more input objects 140 in a sensing region 120. Example input objects 140 include fingers and styli, as shown in FIG. 1. An exemplary capacitive sensor device may be a touchpad, a touch screen, a touch sensor device and the like.

Sensing region 120 encompasses any space above, around, in and/or near the input device 100 in which the input device 100 is able to detect user input, e.g., user input provided by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises: no contact with any surfaces of the input device 100; contact with an input surface, e.g., a touch surface, of the input device 100; contact with an input surface of the input device 100 coupled with some amount of applied force or pressure; and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may utilize capacitive sensing, and may further utilize elastic, resistive, inductive, magnetic, acoustic, ultrasonic, and/or optical techniques.

Some implementations are configured to provide images (e.g., of capacitive signals) that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (also often referred to as "absolute capacitance") sensing methods based on changes in the capacitive coupling between sensor electrodes and an input object (e.g., between a system ground and freespace coupling to the user). In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage, e.g., system ground, and by detecting the capacitive coupling between the sensor electrodes and input objects. In some implementations sensing elements may be formed of a substantially transparent metal mesh (e.g., a reflective or absorbing metallic film patterned to minimize visible transmission loss from the display subpixels). Further, the sensor electrodes may be disposed over a display of a display device. The sensing electrodes may be formed on a common substrate of a display device (e.g., on the encapsulation layer of a rigid or flexible organic light emitting diode (OLED) display). An additional dielectric layer with vias for a jumper layer may also be formed of a substantially transparent metal mesh material (e.g., between the user input and the cathode electrode). Alternately, the sensor may be patterned on a single layer of metal mesh over the display active area with cross-overs outside of the active area. The jumpers of the jumper layer may be coupled to the electrodes of a first group and cross over sensor electrodes of a second group. In one or more embodiments, the first and second groups may be orthogonal axes to each other. Further, in various embodiments, the absolute capacitance measurement may comprise a profile of the input object couplings accumulated along one axis and projected onto the other. In various embodiments, a modulated input object (e.g., a powered active stylus) may be received by the orthogonal electrode axes without modulation of the corresponding electrodes (e.g., relative to a system ground). In such an embodiment, both axes may be sensed simultaneously and combined to estimate stylus position.

Some capacitive implementations utilize "mutual capacitance" (also often referred to as "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also referred to herein as "transmitter electrodes" or "transmitters") and one or more receiver sensor electrodes (also referred to herein as "receiver electrodes" or "receivers"). The coupling may be reduced when an input object coupled to a system ground approaches the sensor electrodes. Transmitter sensor electrodes may be modulated relative to a reference voltage, e.g., system ground, to transmit transmitter signals. Receiver sensor electrodes may be held substantially constant relative to the reference voltage or modulated relative to the transmitter sensor electrodes to facilitate receipt of resulting signals. A resulting signal may comprise effect(s) corresponding to one or more transmitter signals, and/or to one or more sources of environmental interference, e.g., other electromagnetic signals. Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) chips and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (in another embodiment, with associated firmware) separate from the central processing unit. As another example, the input device 100 may be physically integrated in a phone, and the processing system 110 may comprise circuits and firmware that are part of a main processor (e.g., a mobile device application processor or any other central processing unit) of the phone. In some embodiments, the processing system 110 is dedicated to implementing the input device 100. In other embodiments, the processing system 110 also performs other user input functions, such as operating display screens, measuring input forces, measuring tactile switch state, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system, e.g., to a central processing system of the electronic system that is separate from the processing system 110, if such a separate central processing system exists. In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. The filtering may comprise one or more of demodulating, sampling, weighting, and accumulating of analog or digitally converted signals (e.g., for FIR digital or IIR switched capacitor filtering) at appropriate sensing times. The sensing times may be relative to the display output periods (e.g., display line update periods or blanking periods). As yet another example, the processing system 110 may subtract or otherwise account for a baseline, such that the information reflects a difference between the electrical signals from user input and the baseline signals. A baseline may account for display update signals (e.g., subpixel data signal, gate select and deselect signal, or emission control signal) which are spatially filtered (e.g., demodulated and accumulated) and removed from the lower spatial frequency sensing baseline. Further, a baseline may compensate for a capacitive coupling between the sensor electrodes and one or more nearby electrodes. The nearby electrodes may be display electrodes, unused sensor electrodes, and or any proximate conductive object. Additionally, the baseline may be compensated for using digital or analog means. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of a display screen. For example, the sensing region 120 may overlap at least a portion of an active area of a display screen (or display panel). The active area of the display panel may correspond to a portion of the display panel where images are updated. In one or more embodiments, the input device 100 may comprise substantially transparent sensor electrodes (e.g., ITO, metal mesh, etc.) overlaying the display screen and provide a touch screen interface for the associated electronic system. The display panel may be any type of dynamic display capable of displaying a visual interface to a user, and may include any type of light emitting diode (LED), OLED, cathode ray tube (CRT), liquid crystal display (LCD), plasma, electroluminescence (EL), or other display technology. The input device 100 and the display panel may share physical elements. For example, some embodiments may utilize some of the same electrical components for displaying and sensing. As another example, the display panel may be operated in part or in total by the processing system 110.

A cathode electrode of an OLED display may provide a low impedance screen between one or more display electrodes and the sensor electrodes which may be separated by a thin encapsulation layer. For example, the encapsulation layer may be about 10 um. Alternatively, the encapsulation layer may be less than 10 um or greater than 10 um. Further, the encapsulation layer may be comprised of a pin hole free stack of conformal organic and inorganic dielectric layers.

It should be understood that while many embodiments of the disclosure are described in the context of a fully functioning apparatus, the mechanisms of the present disclosure are capable of being distributed as a program product, e.g., software, in a variety of forms. For example, the mechanisms of the present disclosure may be implemented and distributed as a software program on information bearing media that are readable by electronic processors, e.g., non-transitory computer-readable and/or recordable/writable information bearing media readable by the processing system 110. Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
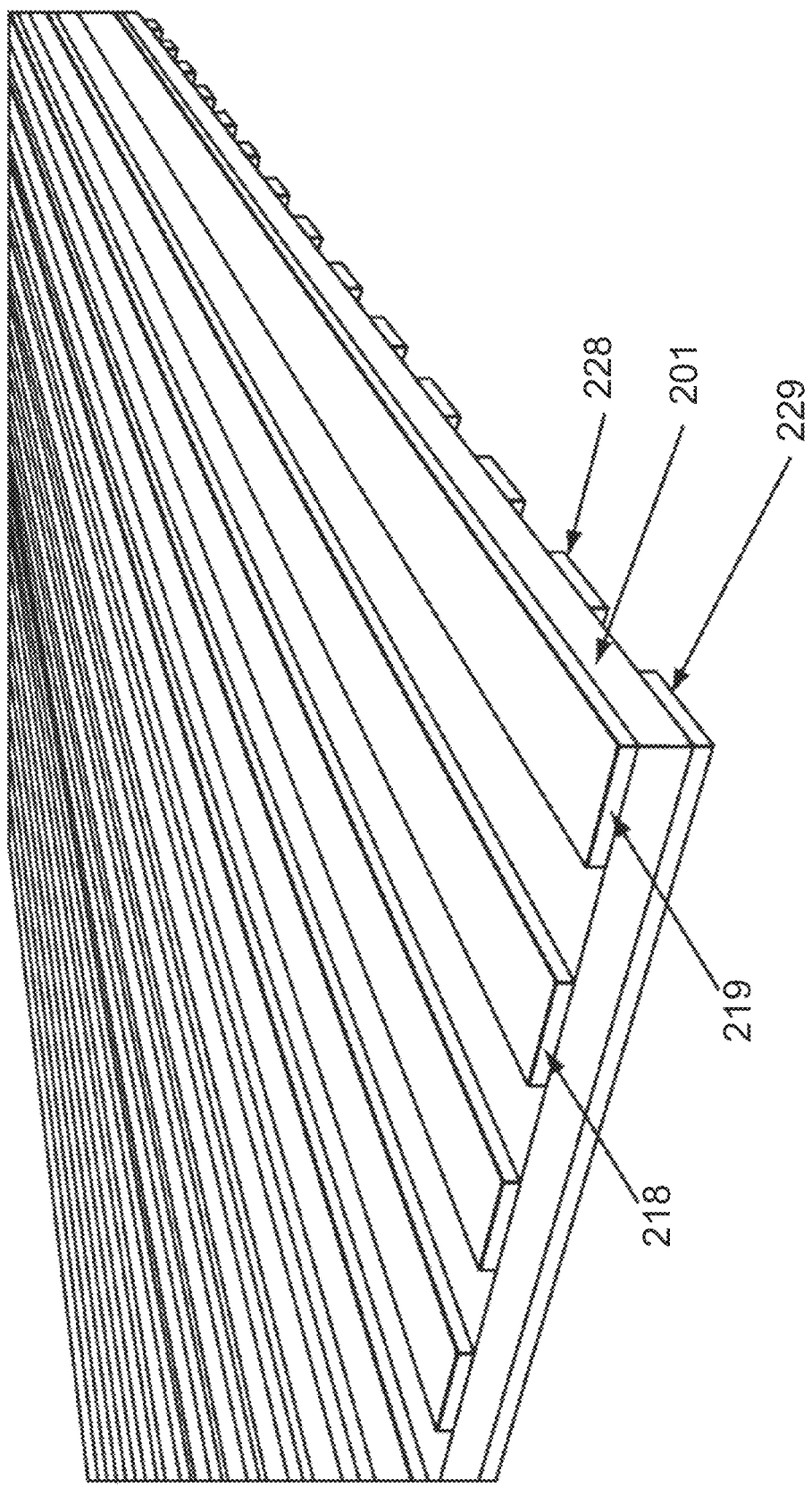
FIGS. 2A-2B depict an exemplary arrangement of electrodes which is usable with exemplary embodiments of the present disclosure.
Figure 2B:
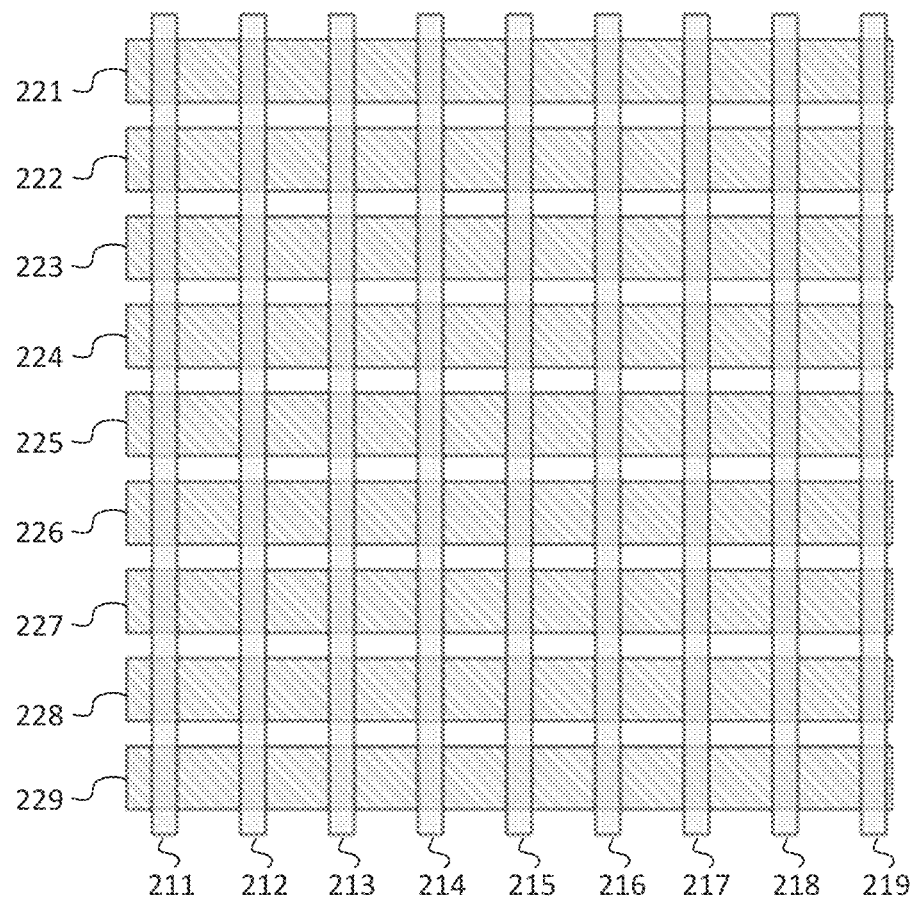

FIGS. 2A-2B depict an exemplary arrangement of electrodes which is usable with exemplary embodiments of the present disclosure. It will be appreciated that the arrangement of rectangular electrodes shown in FIGS. 2A-2B is merely an illustrative example, and that many other types of electrode arrangements may be used in connection with the principles discussed herein.

In conventional transcapacitive sensing systems which utilize an orthogonal array of rectangular electrodes such as the arrangement shown in FIGS. 2A-2B, a first set of electrodes in a first orientation (e.g., horizontal electrodes 221-229 disposed below substrate 201) are utilized as transmitter electrodes on which a processing system (e.g., processing system 110 of FIG. 1) provides drive signals, and a second set of electrodes in a second orientation (e.g., vertical electrodes 211-219 disposed above substrate 201) are utilized as receiver electrodes through which resulting signals are obtained based on the drive signals, whereby the resulting signals are output to the processing system.

In exemplary embodiments of the present disclosure, the second set of electrodes, on their own, are operated in a transcapacitive manner (e.g., with some of vertical non-intersecting electrodes 211-219 being operated as transmitter electrodes and others operated as receiver electrodes), and/or the first set of electrodes, on their own, are operated in a transcapacitive manner (e.g., with some of horizontal non-intersecting electrodes 221-229 being operated as transmitter electrodes and others operated as receiver electrodes). In one exemplary embodiment, one of the sets of electrodes is first operated in a transcapacitive manner to obtain sensing information corresponding to one orientation, followed by the other set of electrodes being operated in a transcapacitive manner to obtain sensing information corresponding to another orientation. In an alternative embodiment, only one of the sets of electrodes is operated in a transcapacitive manner to obtain sensing information corresponding to a respective orientation, which may be sufficient for certain applications.

Although exemplary embodiments of the present disclosure utilize transcapacitive sensing involving transmitter and receiver electrodes, the transcapacitive sensing is used to determine capacitances between neighboring electrodes in the same layer (e.g., in the same plane) which are adjacent to one another (e.g., parallel to one another in the case of rectangular or diamond electrodes) without intersecting one another, non-intersecting electrodes which are second nearest neighbors, non-intersecting electrodes which are third nearest neighbors, etc. Thus, the transcapacitive sensing used in exemplary embodiments of the present disclosure is different from conventional transcapacitive sensing, which typically measures capacitances between intersecting transmitter and receiver electrodes disposed on different layers. The transcapacitive sensing as used in exemplary embodiments of the present disclosure may be conceptualized or thought of as an alternative way of performing absolute capacitance sensing—for example, in a hybrid sensing system which utilizes both absolute capacitance sensing and conventional transcapacitive sensing, the transcapacitive sensing of the exemplary embodiments could be used as a replacement for the absolute capacitance sensing portion of the hybrid sensing system, as it provides advantages associated with absolute capacitance sensing (e.g., relatively high SNR) while avoiding the drawbacks of using absolute capacitance sensing for proximity sensing (e.g., avoiding the problem of high background coupling in certain applications).

As mentioned above, the arrangement shown in FIGS. 2A-2B is merely an illustrative example, and many other electrode arrangements may be used in connection with the principles discussed herein. For example, any electrode pattern may be used in another exemplary embodiment (such as diamonds, multiple-prongs of bars-and-stripes sensors, interleaved sensor patterns, matrix pad sensors, etc.). In other embodiments, the electrodes may be deposited on the same layer, and appropriate electrodes which need to be connected are electrically linked together by jumpers. In yet other embodiments, all the electrodes are deposited in the same layer, but with no jumpers, in which case the routing runs through the interior of the 2D area of the sensors, and as a result, all the electrodes are designed to run parallel to each other.

Additionally, it will be appreciated that the number of electrodes provided in each orientation as depicted in FIGS. 2A-2B is not a limitation, as in practice, many different array sizes may be used. For example, sensor arrays used in many phones may have between 15-20 transmitters and 30-40 receivers. In devices with larger screens, there may be 25-35 transmitters and 60-70 receivers. The number of channels may be based on ASIC design, which limits the amount of available channels, and/or may be based on sensor design. For example, it takes a longer time to drive larger screens, which means that for a given framerate less measurements can be performed, which in turn leads to lower SNRs. Thus, the underlying RC time constant poses another practical limitation on the supported sensor size. In capacitive fingerprint sensors, the channel count may be around 256 on the longer axis.

Further, it will be appreciated that exemplary embodiments of the present disclosure are applicable to a wide variety of devices which employ capacitive sensing. For example, exemplary embodiments of the present disclosure may be implemented in on-cell touchscreen display devices, in-cell touchscreen display devices, touchpad devices, standalone fingerprint sensors, device-integrated fingerprint sensors, display-integrated fingerprint sensors, etc., and such exemplary embodiments may achieve various advantages, for example, with respect to touch sensing, proximity sensing (such as for face detection), moisture sensing, LGM correction, and in any other situation where absolute sensing may be needed in addition to the traditional transcapacitive sensing (e.g., whenever hybrid transcapacitive and absolute sensing would be applicable).

Figure 3:
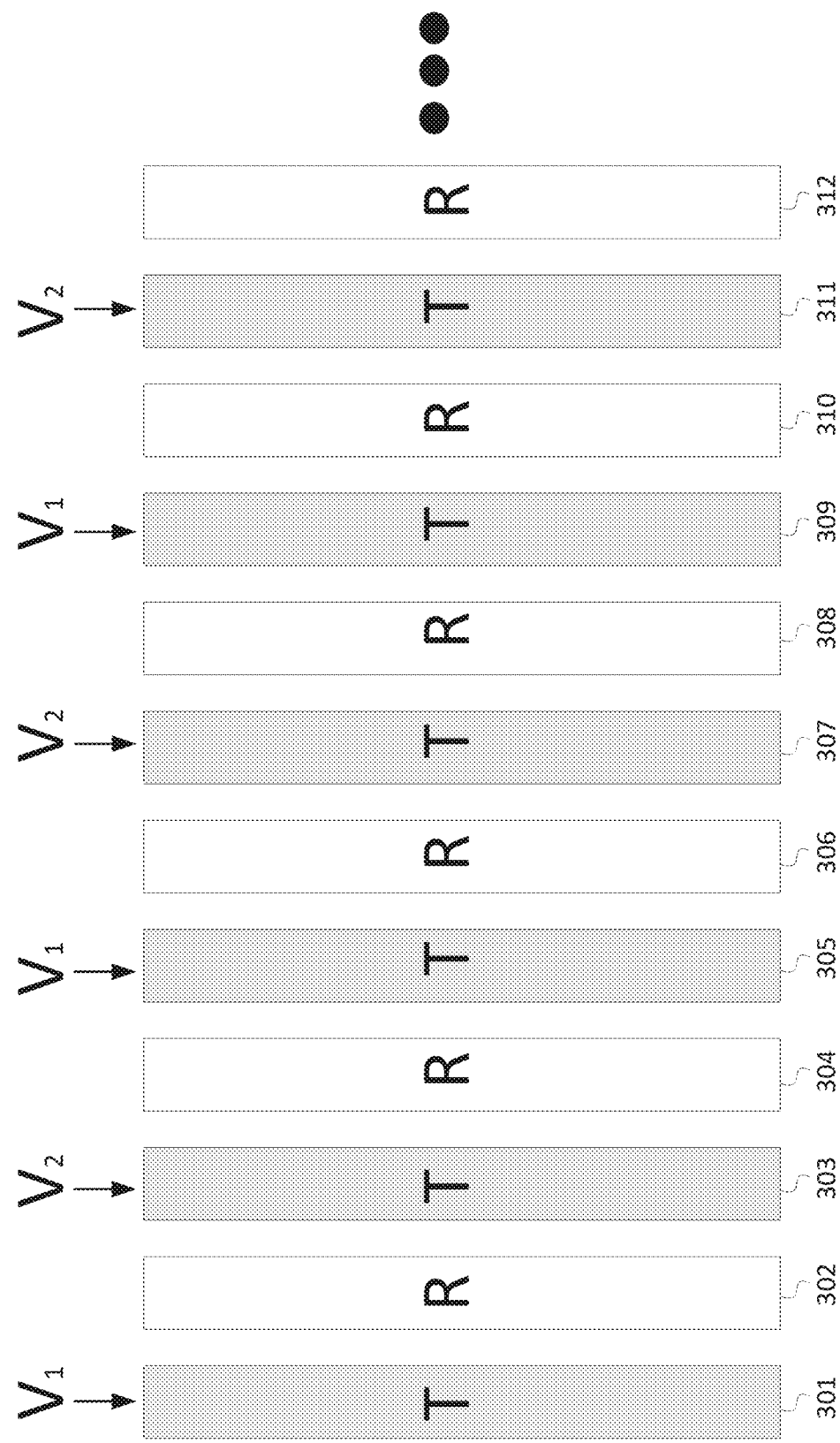
FIG. 3 depicts a driving scheme for a set of electrodes in accordance with an exemplary embodiment of the present disclosure.

FIG. 3 depicts a driving scheme for a set of electrodes in accordance with an exemplary embodiment of the present disclosure. The set of electrodes may be, for example, a set of vertical parallel rectangular electrodes 301, 302, 303, 304, 305, 306, 307, 308, 309, 310, 311, 312, . . . disposed above a set of horizontal parallel rectangular electrodes, such that the vertical parallel rectangular electrodes shown in FIG. 3 are part of an array of sensor electrodes similar to the type of configuration shown in FIGS. 2A-2B.

As shown in FIG. 3, every odd electrode is operated as a transmitter electrode (i.e., electrodes 301, 303, 305, 307, 309, 311), and every even electrode is operated as a receiver electrode (i.e., electrodes 302, 304, 306, 308, 310, 312). The transmitter electrodes are driven with two basis functions $\{V_1(t), V_2(t)\}$ with a period T. These two basis functions may be taken from a larger set of basis functions which span the time domain $[0,T]$. Of special interest are orthogonal basis functions because of their easy inversion properties, but a non-orthogonal basis may be used as well. The use of the two basis functions allows for separately determining the capacitive coupling between electrode 301 and electrode 302 versus the capacitive coupling between electrode 302 and electrode 303.

Disregarding capacitive coupling effects except for the capacitive coupling effects between nearest neighbors (e.g., electrode 306 is assumed to receive the voltage signal $V_1(t)$ only from electrode 305, and as a result, only the capacitance between electrodes 306 and 305 ($C_{306,305}$) is taken into consideration, with the signals $V_1(t)$ which are driven onto transmitter electrodes 301 and 309 being assumed to be too weak to reach receiver 306, such that the capacitances between electrodes 306 and 309, and between 306 and 301 are ignored; likewise, electrode 306 is assumed to receive the signal $V_2(t)$ only from transmitter electrode 307, and therefore, only the capacitance between electrodes 306 and 307 ($C_{306,307}$) is taken into consideration, while disregarding the capacitances between electrodes 306 and 303, and between electrodes 306 and 311), the capacitive couplings which make a charge contribution to receiver electrode 306 may be expressed as:

$$Q_{306}(t) = C_{306,305} \cdot V_1(t) + C_{306,307} \cdot V_2(t).$$

The capacitances $C_{306,305}$ and $C_{306,307}$ can then be determined by multiplying the charge $Q_{306}$ by $V_1$ and $V_2$ respectively, integrating over the period T, and making use of the orthogonality relationship to get:

$$C_{306,305} = \frac{\langle Q_{306}, V_1 \rangle_T}{\langle V_1, V_1 \rangle_T} \text{ and } C_{306,307} = \frac{\langle Q_{306}, V_2 \rangle_T}{\langle V_2, V_2 \rangle_T}.$$

It will be appreciated that that if $V_1$ and $V_2$ are not orthogonal, the variational formulation leads to a linear system, and a 2×2 matrix is inverted to obtain the two capacitances.

Based on the foregoing manner of operating the set of electrodes shown in FIG. 3, the capacitance between nearest neighbors (without taking into consideration the small amount of residual charge that comes from non-nearest neighbors) may be determined with a reduced amount of noise (relative to driving all transmitter electrodes with the same waveform). In an exemplary implementation where two Walsh-Hadamard basis functions of order 2 are used for $V_1(t)$ and $V_2(t)$, defined by $$V_1(t) = \begin{cases} 1, & 0 < t < \Delta_T \\ 1, & \Delta_T < t < 2\Delta_t \end{cases} \quad V_2(t) = \begin{cases} 1, & 0 < t < \Delta_T \\ -1, & \Delta_T < t < 2\Delta_t \end{cases},$$

the noise reduction may be $1/\sqrt{2}$ in the 12-norm. To achieve further improvement with regard to noise reduction, more basis functions may be used. To accommodate for proper resolution of higher frequency basis functions, the period T may need to be increased. For example, instead of the two Walsh-Hadamard basis functions introduced above with a period of $T=2\Delta_T$, two of the four Walsh-Hadamard basis functions $$h_1(t) = \begin{cases} -1, & 0 \le t \le \Delta_T \\ +1, & \Delta_T \le t \le 2\Delta_T \\ +1, & 2\Delta_T \le t \le 3\Delta_T \\ +1, & 3\Delta_T \le t \le 4\Delta_T \end{cases}, \quad h_2(t) = \begin{cases} +1, & 0 \le t \le \Delta_T \\ -1, & \Delta_T \le t \le 2\Delta_T \\ +1, & 2\Delta_T \le t \le 3\Delta_T \\ +1, & 3\Delta_T \le t \le 4\Delta_T \end{cases}$$

$$h_3(t) = \begin{cases} +1, & 0 \le t \le \Delta_T \\ +1, & \Delta_T \le t \le 2\Delta_T \\ -1, & 2\Delta_T \le t \le 3\Delta_T \\ +1, & 3\Delta_T \le t \le 4\Delta_T \end{cases}, \quad h_4(t) + \begin{cases} +1, & 0 \le t \le \Delta_T \\ +1, & \Delta_T \le t \le 2\Delta_T \\ +1, & 2\Delta_T \le t \le 3\Delta_T \\ -1, & 3\Delta_T \le t \le 4\Delta_T \end{cases}$$

may be used with period $T=4\Delta_T$. More generally, using a sequence of N entries, driving each entry of the sequence with the duration of $\Delta_T$, the period becomes then $T=N \cdot \Delta_T$ and any of the N basis functions can be used to define $V_1$ and $V_2$. The solution of the capacitances would be computed with the same above formula. The noise reduction in the 12-norm would be then $1/\sqrt{N}$. The longer driving time means that more moving artifacts can creep in, which is only of concern if very fast objects movements need to be detected. In other exemplary implementations, other types of basis functions (e.g., sine, cosine, polynomial, Chebyshev, Legendre, etc.) may be used as well. It will be appreciated that the noise reduction associated with different types of basis functions is different.

Without disregarding the capacitances between electrodes which are not nearest neighbors, the above equation for $Q_{306}(t)$ becomes:

$$Q_{306}(t) = (C_{306,305} + C_{306,309} + C_{306,301}) \cdot V_1(t) + (C_{306,307} + C_{306,303} + C_{306,311}) \cdot V_2(t).$$

Thus, the determined capacitance for electrode 306 corresponding to the first basis function $V_1(t)$ may actually include the capacitances between electrodes 306 and 305, between electrodes 306 and 309, and between electrodes 306 and 301 (i.e., $C_{306,305}+C_{306,309}+C_{306,301}$). Similarly, the determined capacitance for electrode 306 corresponding to the second basis function $V_2(t)$ may actually include the capacitances between electrodes 306 and 307, between electrodes 306 and 303, and between electrodes 306 and 311 (i.e., $C_{306,307}+C_{306,303}+C_{306,311}$). If only two basis functions are used, the system can only determine the summation of the capacitances $C_{306,305}+C_{306,309}+C_{306,301}$ and $C_{306,307}+C_{306,303}+C_{306,311}$.

It will be appreciated that the principles discussed above in connection with electrode 306 are also respectively applicable to electrodes 302, 304, 308, 310 and 312, as well as any other electrodes in the depicted set of electrodes (which may include further electrodes beyond electrode 312). While the first basis function is driven onto transmitter electrodes 301, 305 and 309, each of receiver electrodes 302, 304, 306, 308, 310 and 312 may obtain corresponding resulting signals indicating respective capacitances associated with the respective receiver electrodes, and while the second basis function is driven onto transmitter electrodes 303, 307 and 311, each of receiver electrodes 302, 304, 306, 308, 310 and 312 may obtain corresponding resulting signals indicating respective capacitances associated with the respective receiver electrodes.

Figure 4A:
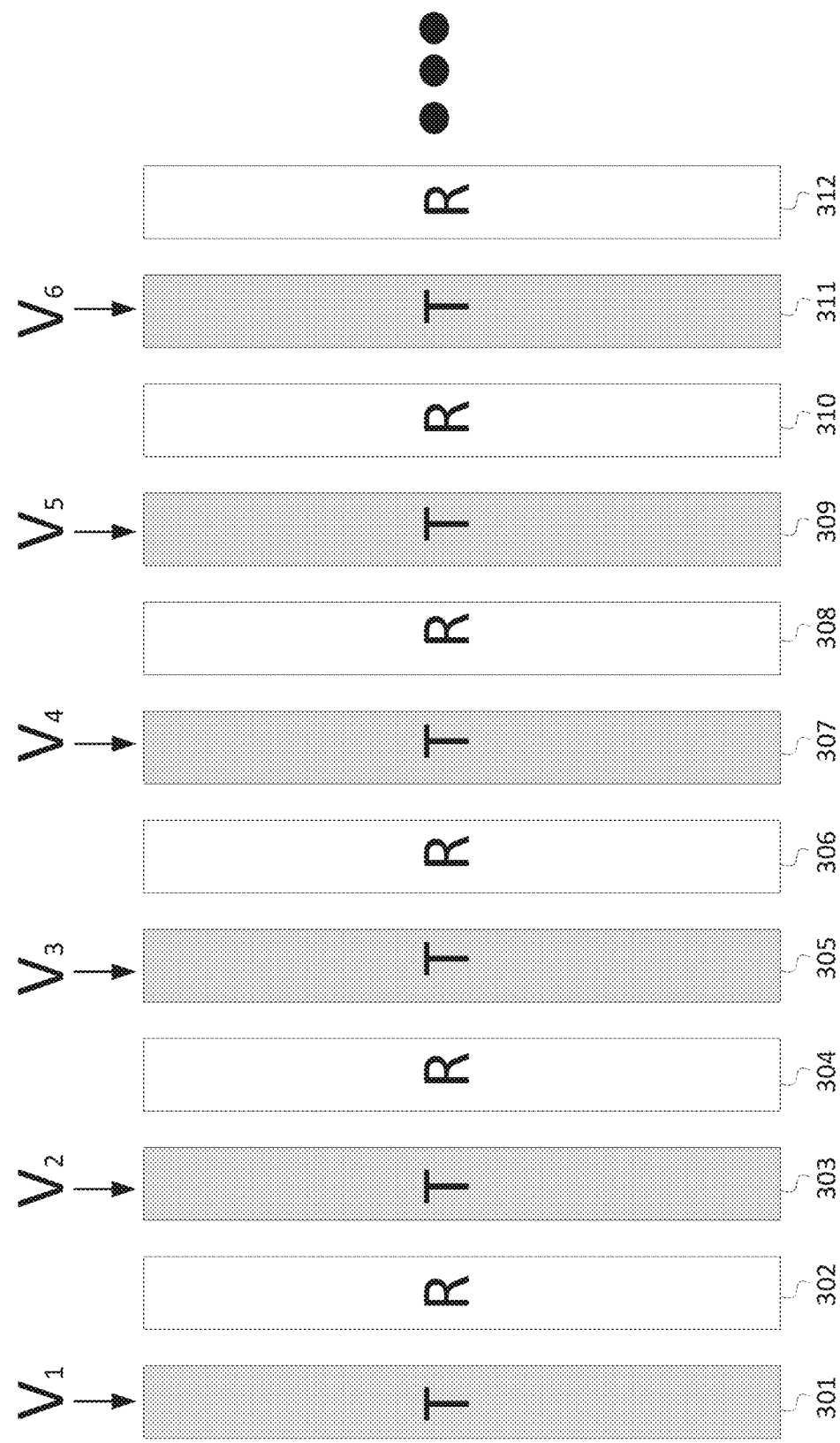

In further exemplary embodiments, a larger number of basis functions may be used to avoid or mitigate the situation where the capacitance detected by a respective receiver electrode includes effects from multiple transmitter electrodes. FIG. 4A depicts a driving scheme for a set of electrodes in accordance with another exemplary embodiment of the present disclosure. FIG. 4A is similar to FIG. 3 except that six basis functions $\{V_1(t), V_2(t), V_3(t), V_4(t), V_5(t), V_6(t)\}$ (having order 6 or larger) are utilized for driving the six depicted transmitter electrodes 301, 303, 305, 307, 309, 311. By utilizing these six basis functions, the respective capacitances between a receiver electrode, such as electrode 302, and each of the respective transmitter electrodes 301, 303, 305, 307, 309 and 311 can be individually determined. For example, the capacitive couplings which make a charge contribution to receiver electrode 306 may be expressed as:

$$Q_{306}(t) = C_{306,301} \cdot V_1(t) + C_{306,303} \cdot V_2(t) + C_{306,305} \cdot V_3(t) + C_{306,307} \cdot V_4(t) + C_{306,309} \cdot V_5(t) + C_{306,311} \cdot V_6(t).$$

The capacitances $C_{306,301}$, $C_{306,303}$, $C_{306,305}$, $C_{306,307}$, $C_{306,309}$, and $C_{306,311}$ can then be determined by multiplying the charge $Q_{306}$ by $V_1$ through $V_6$ respectively, integrating over the period T, and making use of the orthogonal basis to get:

$$C_{306,301} = \frac{\langle Q_{306}, V_1 \rangle_T}{\langle V_1, V_1 \rangle_T}, \quad C_{306,303} = \frac{\langle Q_{306}, V_2 \rangle_T}{\langle V_2, V_2 \rangle_T},$$

$$C_{306,305} = \frac{\langle Q_{306}, V_3 \rangle_T}{\langle V_3, V_3 \rangle_T}, \quad C_{306,307} = \frac{\langle Q_{306}, V_4 \rangle_T}{\langle V_4, V_4 \rangle_T},$$

-continued $$C_{306,309} = \frac{\langle Q_{306}, V_5 \rangle_T}{\langle V_5, V_5 \rangle_T}, \text{ and } C_{306,311} = \frac{\langle Q_{306}, V_6 \rangle_T}{\langle V_6, V_6 \rangle_T}.$$

Thus, the driving scheme shown in FIG. 4A is able to obtain the respective capacitances between each receiver and each transmitter electrode depicted in FIG. 4A. If the basis set is not orthogonal, a linear system of 6 equations is obtained, and the capacitances can be recovered by inverting the system matrix.

The driving scheme for a single respective scan shown in FIG. 4A is able to determine capacitances between nearest neighbors on both sides (e.g., between electrodes 306 and 305, and between electrodes 306 and 307), third-nearest neighbors on both sides (e.g., between electrodes 306 and 303, and between electrodes 306 and 309), and fifth-nearest neighbors on both sides (e.g., between electrodes 306 and 301, and between electrodes 306 and 311). It will be appreciated that the ellipsis in FIG. 4A indicates that the $V_1$-$V_6$ pattern shown in FIG. 4A may be continued for additional electrodes in a set of non-intersecting electrodes having more than 12 electrodes.

It will be appreciated that in certain implementations in which there is good grounding, the capacitive coupling between electrodes which are relatively far from each other (for example, between electrodes 306 and 301 and between electrodes 306 and 311, which are fifth-nearest-neighbor pairs) may be so low as to be negligible. Thus, in such implementations, the processing system may only determine and/or use the capacitances between the nearest neighbors and the third-nearest neighbors, while capacitances between the fifth-nearest neighbors are left undetermined or determined but disregarded. However, in other implementations, for example for LGM applications, couplings of remote parallel electrodes may be of interest, such that all obtained couplings are taking into consideration.

Additionally, in an exemplary embodiment not concerned with capacitive couplings between fifth-nearest neighbors (and beyond), the driving scheme of FIG. 4A may be modified to use four basis functions (having order 4 or larger) instead of six basis functions, as four basis functions would provide individual capacitances between a respective receiver electrode and its nearest and third-nearest neighbors on both sides (e.g., for receiver electrode 306, four different basis functions may be driven onto transmitter electrodes 303, 305, 307 and 309). This is shown in FIG. 4D, and it will be appreciated that the ellipsis in FIG. 4D indicates that the $V_1$-$V_4$ pattern shown in FIG. 4D may be continued for additional electrodes in a set of non-intersecting electrodes having more than 12 electrodes.

Figure 4B:
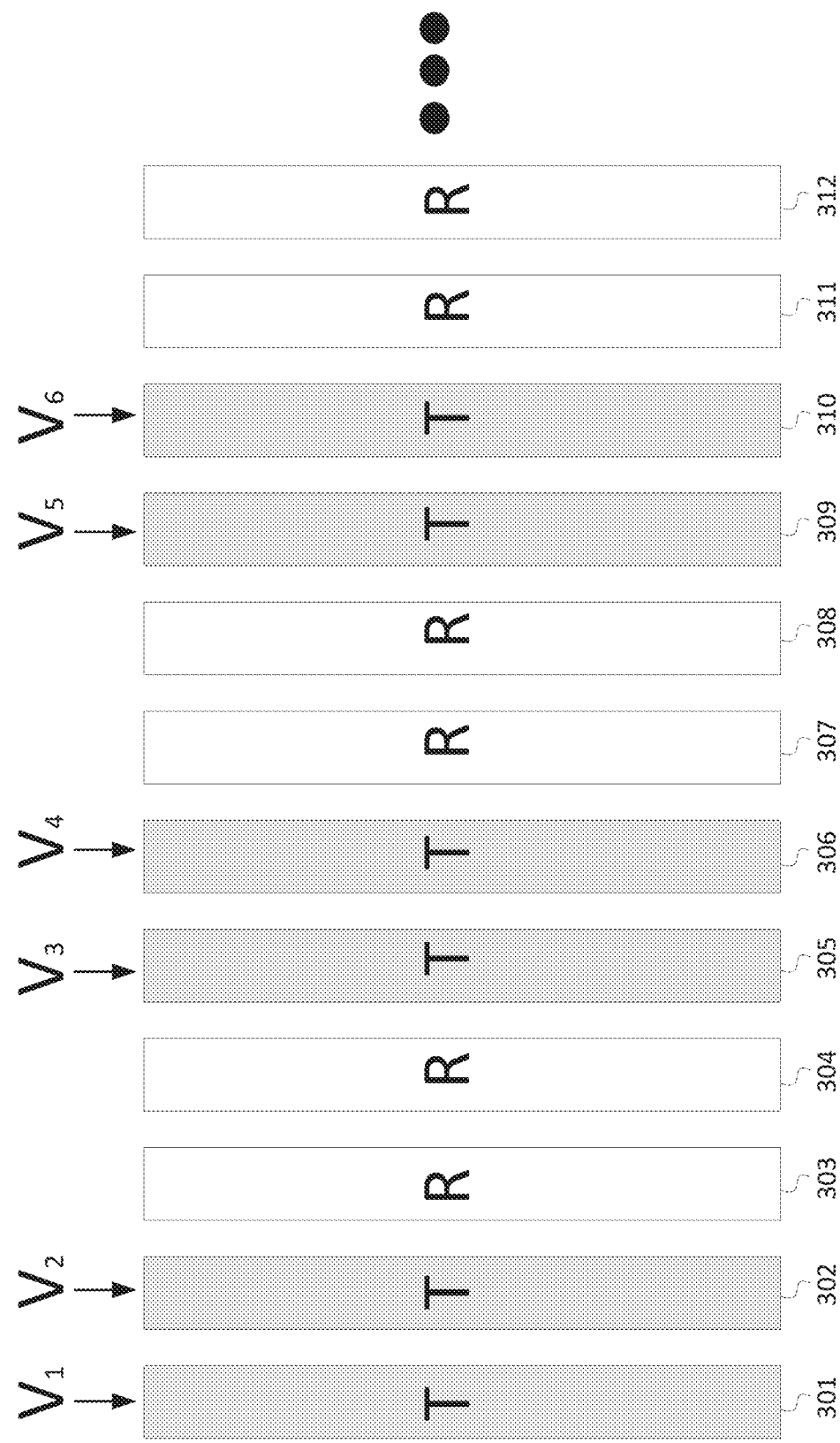
Figure 4C:
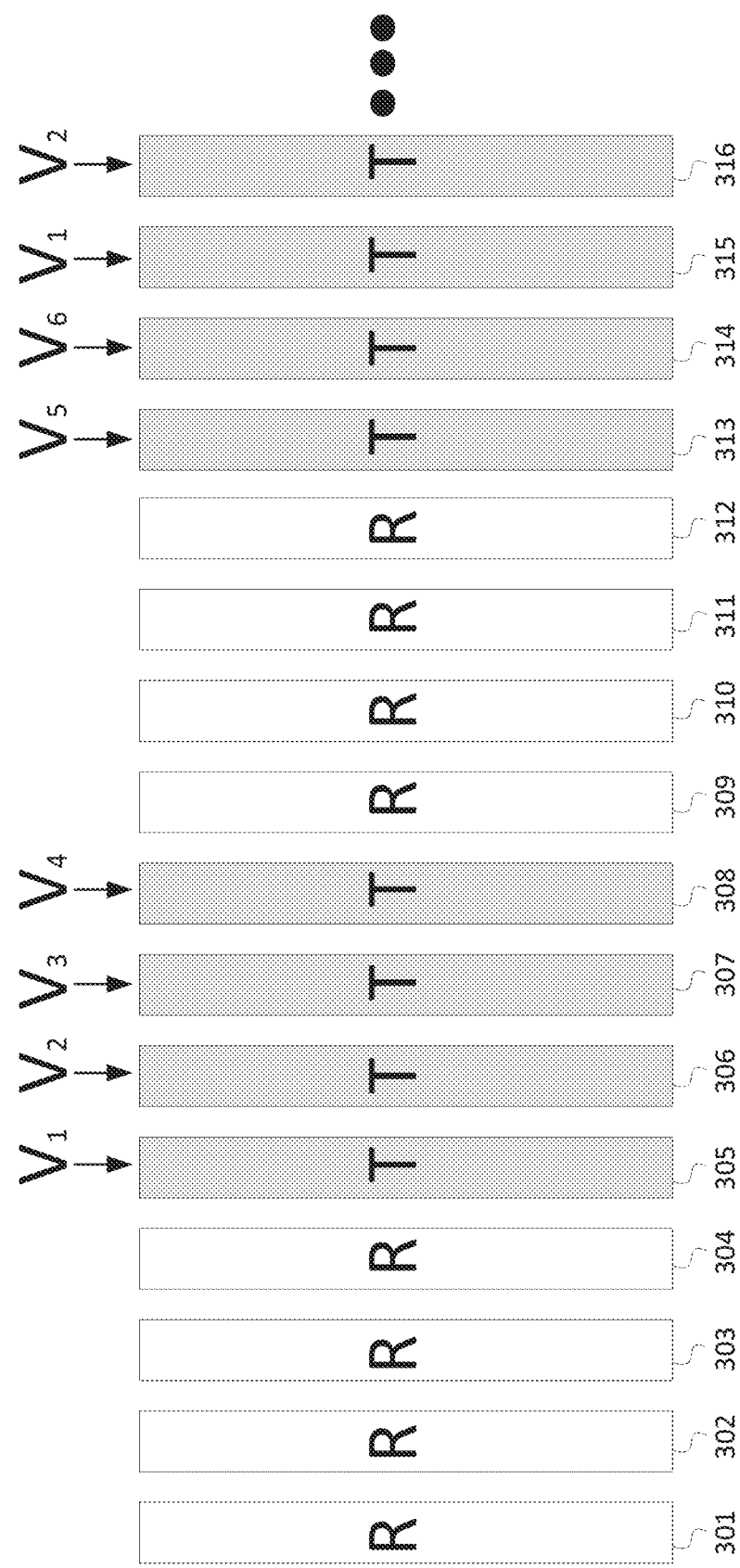
Figure 4D:
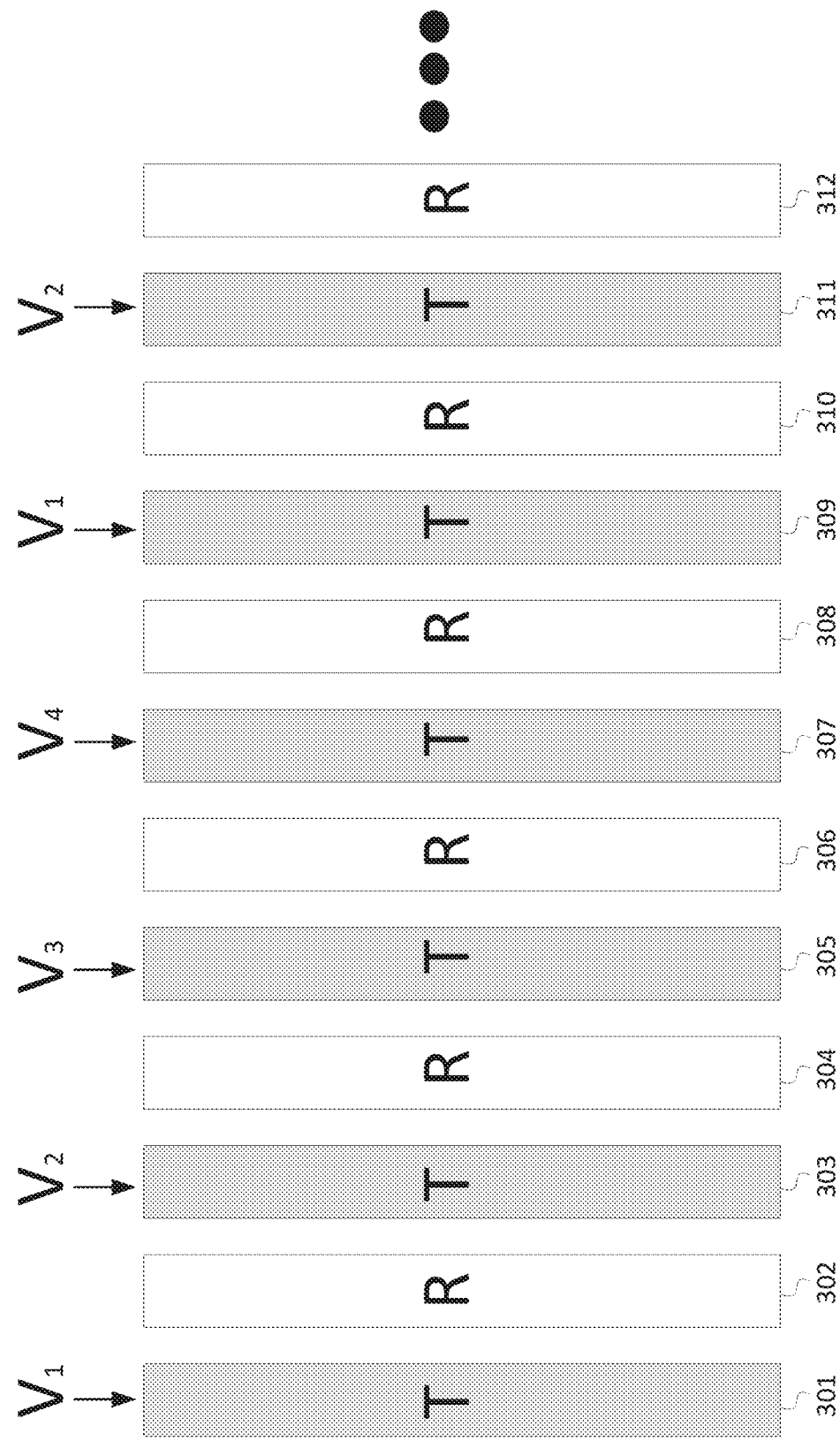

It will be appreciated that, according to FIG. 4D, the determined capacitances between certain electrode pairs (such as the determined capacitance at receiver electrode 306 corresponding to basis function $V_2$ driven onto transmitter electrode 303) may also technically include effects from other electrodes (such as basis function $V_2$ driven onto transmitter electrode 311 affecting the determined capacitance between electrodes 303 and 306). However, the farther electrode in the situation of FIG. 4D, which would be a fifth-nearest neighbor or farther, would generally have such a small effect that it may be considered as being negligible in a good grounded situation (and may be assumed to be 0). Similarly, in FIG. 4A for example, if the sensor array included a thirteenth electrode to the right of receiver electrode 312, with the basis function $V_1$ driven onto the thirteenth electrode, it is possible that the capacitance determined at receiver electrode 306 corresponding to basis function $V_1$ includes effects from both electrode 301 (fifth-nearest neighbor) and the thirteenth electrode (seventh-nearest neighbor). In this case, the effects from the farther electrode (i.e., the seventh-nearest neighbor) may be considered as being negligible in good grounded conditions (and may be assumed to be 0). In further exemplary embodiments, if no single basis function is used for multiple transmitter electrodes, then individual capacitances may be determined between all receiver-transmitter pairs without having to assume that any contribution is negligible or 0—for example, if there are 44 electrodes including 22 transmitter and 22 receiver electrodes, then 22 basis functions may be used to obtain individual capacitances between each receiver-transmitter electrode pair.

For certain sensing applications (such as proximity sensing or object detection), a single scan in accordance with the driving scheme shown in FIG. 4A may be sufficient if capacitances between second-nearest neighbors are not needed (e.g., between electrodes 301 and 303, between 302 and 304, between 303 and 305, etc.). However, for other sensing applications (such as for moisture and LGM correction algorithms, display noise removal, etc.), it may be desirable to further obtain capacitances between second-nearest neighbors and/or fourth-nearest neighbors, and such capacitances may be obtained using further scans in accordance with the exemplary driving schemes depicted in FIGS. 4B-4C.

FIG. 4B depicts a driving scheme for a scan which may be conducted in addition to a scan that utilizes the driving scheme depicted in FIG. 4A. In FIG. 4B, a different subset of the set of electrodes is operated as transmitter electrodes (different relative to FIG. 4A), and a different subset of the set of electrodes is operated as receiver electrodes (different relative to FIG. 4A). In the exemplary driving scheme shown in FIG. 4B, since electrodes 301, 302, 305, 306, 309 and 310 are now operated as transmitter electrodes with six basis functions being utilized, capacitive couplings between second-nearest neighbors (e.g., between electrodes 306 and 308, and between electrodes 306 and 304) may further be determined (in addition to the capacitive couplings determinable from the driving scheme shown in FIG. 4A). It will be appreciated that the ellipsis in FIG. 4B indicates that the $V_1$-$V_6$ pattern shown in FIG. 4B may be continued for additional electrodes in a set of non-intersecting electrodes having more than 12 electrodes.

Additionally, in an alternative exemplary embodiment, the driving scheme depicted in FIG. 4B may be modified to use four basis functions (having order 4 or larger) instead of six basis functions. This is shown in FIG. 4E, and it will be appreciated that the ellipsis in FIG. 4E indicates that the $V_1$-$V_4$ pattern shown in FIG. 4E may be continued for additional electrodes in a set of non-intersecting electrodes having more than 12 electrodes. The use of four basis functions would still provide individual capacitances between a respective receiver electrode and its second-nearest neighbors on both sides (e.g., for receiver electrode 307, different basis functions may be driven onto transmitter electrodes 305 and 309). There is a difference between FIG. 4E and FIG. 4B, however, with regard to the threshold at which effects of relatively far out electrodes are avoided. In FIG. 4E, for example, receiver electrode 303 is affected by basis function $V_1$ on the left side via its second-nearest neighbor (transmitter electrode 301) and may be affected by basis function $V_1$ on the right side via its sixth-nearest neighbor (transmitter electrode 309), with the effect of the sixth-nearest neighbor being considered as being negligible.

In FIG. 4B, for example, receiver electrode 303 is affected by basis function $V_1$ on the left side via its second-nearest neighbor (transmitter electrode 301) and may be affected by basis function $V_1$ on the right side via an eighth-nearest neighbor, with the effect of the eighth-nearest neighbor being considered as being negligible.

FIG. 4C depicts a driving scheme for a scan in which another different subset of the set of electrodes is operated as transmitter electrodes (different relative to FIGS. 4A-4B), and another different subset of the set of electrodes is operated as receiver electrodes (different relative to FIGS. 4A-4B). In the exemplary driving scheme shown in FIG. 4C, since electrodes 305, 306, 307, 308, 313, 314, 315 and 316 are now operated as transmitter electrodes with six basis functions being utilized, capacitive couplings between fourth-nearest neighbors (e.g., between electrodes 301 and 305, between electrodes 302 and 306, between electrodes 303 and 307, between electrodes 304 and 308, between electrodes 305 and 309, between electrodes 306 and 310, between electrodes 307 and 311, between electrodes 308 and 312, between electrodes 309 and 313, between electrodes 3310 and 314, between electrodes 311 and 315, between electrodes 312 and 316, etc.) may be determined (in addition to the capacitive couplings determinable from the driving schemes shown in FIGS. 4A-4B). It will be appreciated that extending the pattern shown in FIG. 4C, for example, for a set of 24 electrodes, would include the receivers and transmitter electrodes being arranged as RRRRTTTTRRRRTTT-TRRRRTTTT (where each R represents a receiver electrode and each T represents a transmitter electrode, and where the six basis functions may be driven onto the 12 Ts in the order $V_1V_2V_3V_4\text{-}V_5V_6V_1V_2\text{-}V_3V_4V_5V_6$).

It will be appreciated that if three scans are performed in accordance with FIGS. 4A, 4B and 4C, respectively, capacitive couplings between pairs of electrodes from nearest-neighbor pairs up to fourth-nearest neighbor pairs are able to be determined. If capacitive couplings between all fifth-nearest neighbor pairs or even further neighbor pairs are to be determined, additional scans may be performed in accordance with the above-discussed principles and/or additional basis functions may be added.

In practice, it may generally be sufficient for a processing system connected to a sensor array to determine and utilize capacitive couplings between nearest neighbors, capacitive couplings between second-nearest neighbors, and/or capacitive couplings between third-nearest neighbors in good grounded conditions. Thus, in many implementations, performing a single scan (e.g., a single scan in accordance with FIG. 4A or FIG. 4D for proximity sensing or object detection) or two scans (e.g., a first scan in accordance with FIG. 4A or FIG. 4D and a second scan in accordance with FIG. 4B or FIG. 4E) may be sufficient. For example, in an exemplary embodiment where the processing system makes use of capacitive couplings between nearest neighbors, capacitive couplings between second-nearest neighbors, and capacitive couplings between third-nearest neighbors, a first scan using the driving scheme of FIG. 4D may first be performed, followed by a scan using the driving scheme of FIG. 4E. The first scan provides respective capacitive couplings between nearest neighbors and third-nearest neighbors, and the second scan provides respective capacitive couplings between second-nearest neighbors.

It will be appreciated that when multiple scans are performed, there may be overlapping information that is obtained. For example, the driving scheme of FIG. 4D and the driving scheme of FIG. 4E are both able to provide capacitance information regarding the capacitance between certain nearest neighbors (e.g., electrodes 306 and 307). Similarly, the driving scheme of FIG. 4D and the driving scheme of FIG. 4E are both able to provide capacitance information regarding the capacitance between certain third-nearest-neighbors (e.g., electrodes 305 and 308). In such situations, the processing system may be configured to utilize both pieces of information (e.g., through averaging) or may be configured to choose one over the other (e.g., choosing the earlier-received information or the later-received information).

In exemplary embodiments where capacitive couplings between fourth-nearest neighbors (or beyond) are of interest, one or more additional scans as discussed above may be performed. For example, in an exemplary embodiment where the processing system makes use of capacitive couplings between nearest neighbors, capacitive couplings between second-nearest neighbors, capacitive couplings between third-nearest neighbors, and capacitive couplings between fourth-nearest neighbors, a first scan using the driving scheme of FIG. 4A may first be performed, followed by a second scan using the driving scheme of FIG. 4B, followed by a third scan using the driving scheme of FIG. 4C. The first scan provides respective capacitive couplings between nearest neighbors and third-nearest neighbors, the second scan provides respective capacitive couplings between second-nearest neighbors, and the third scan provides respective capacitive couplings between fourth-nearest neighbors.

Figure 5A:
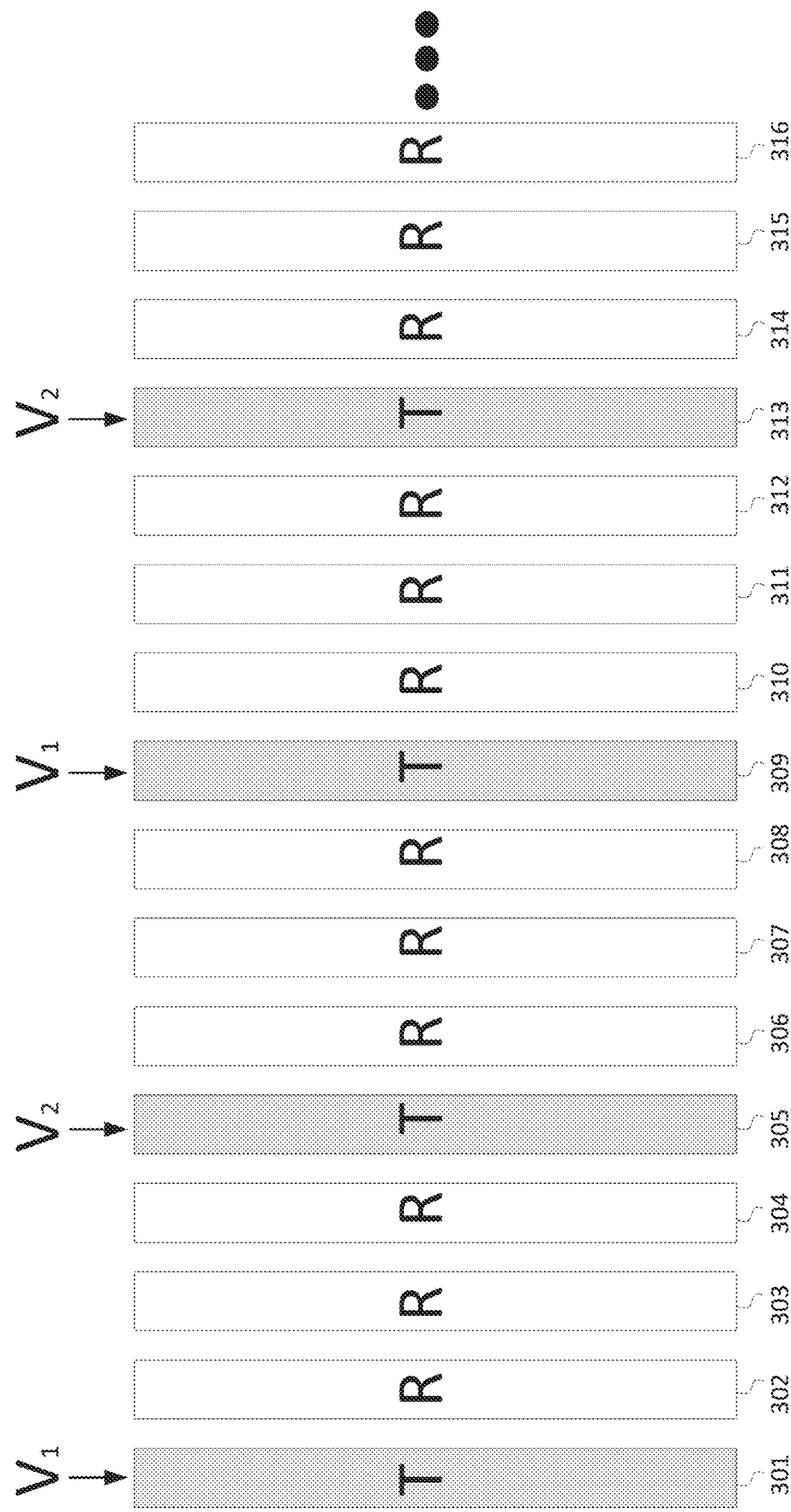
FIGS. 5A-5C depict driving schemes for a set of electrodes in accordance with additional exemplary embodiments of the present disclosure.
Figure 5B:
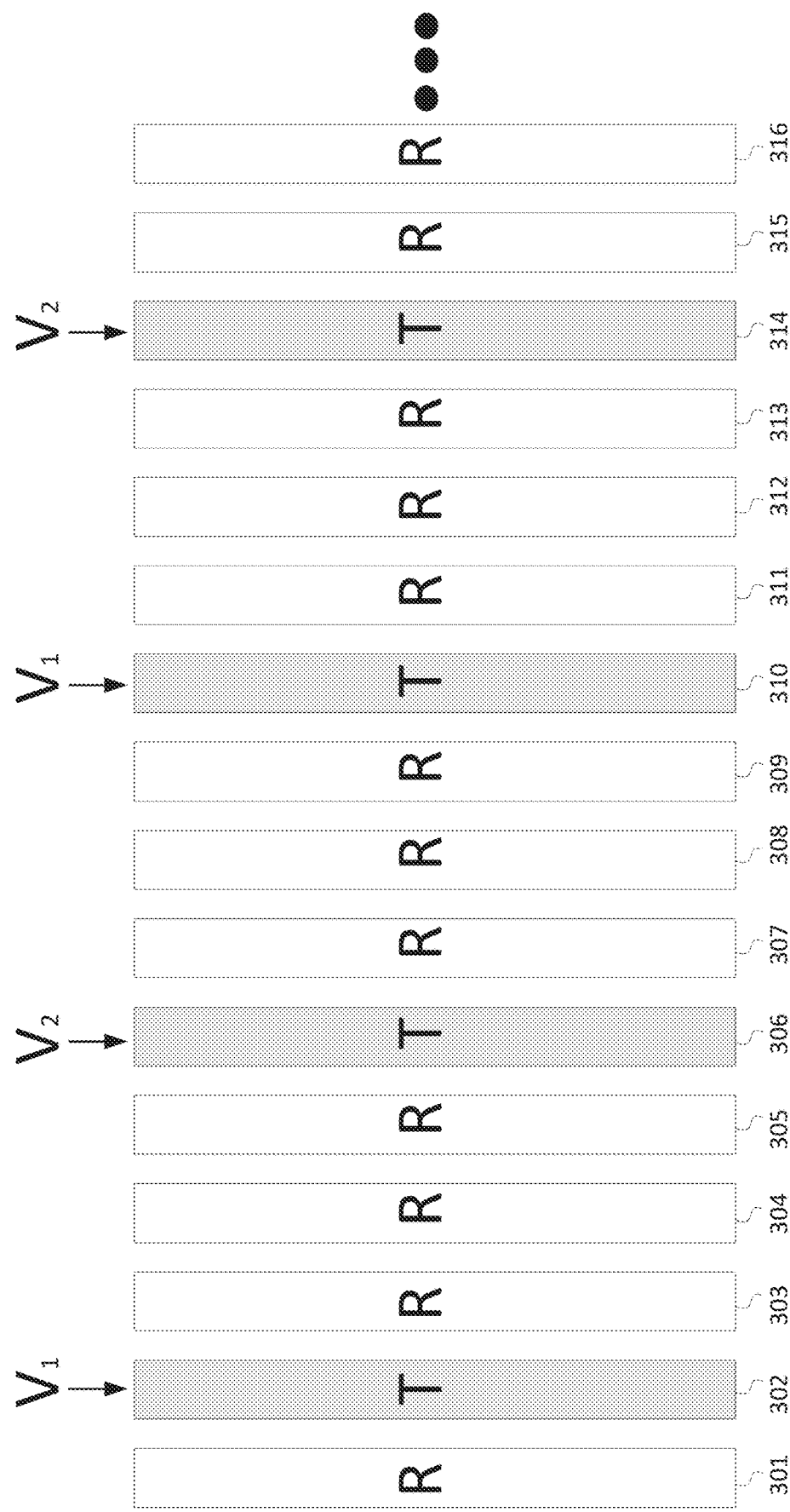
Figure 5C:
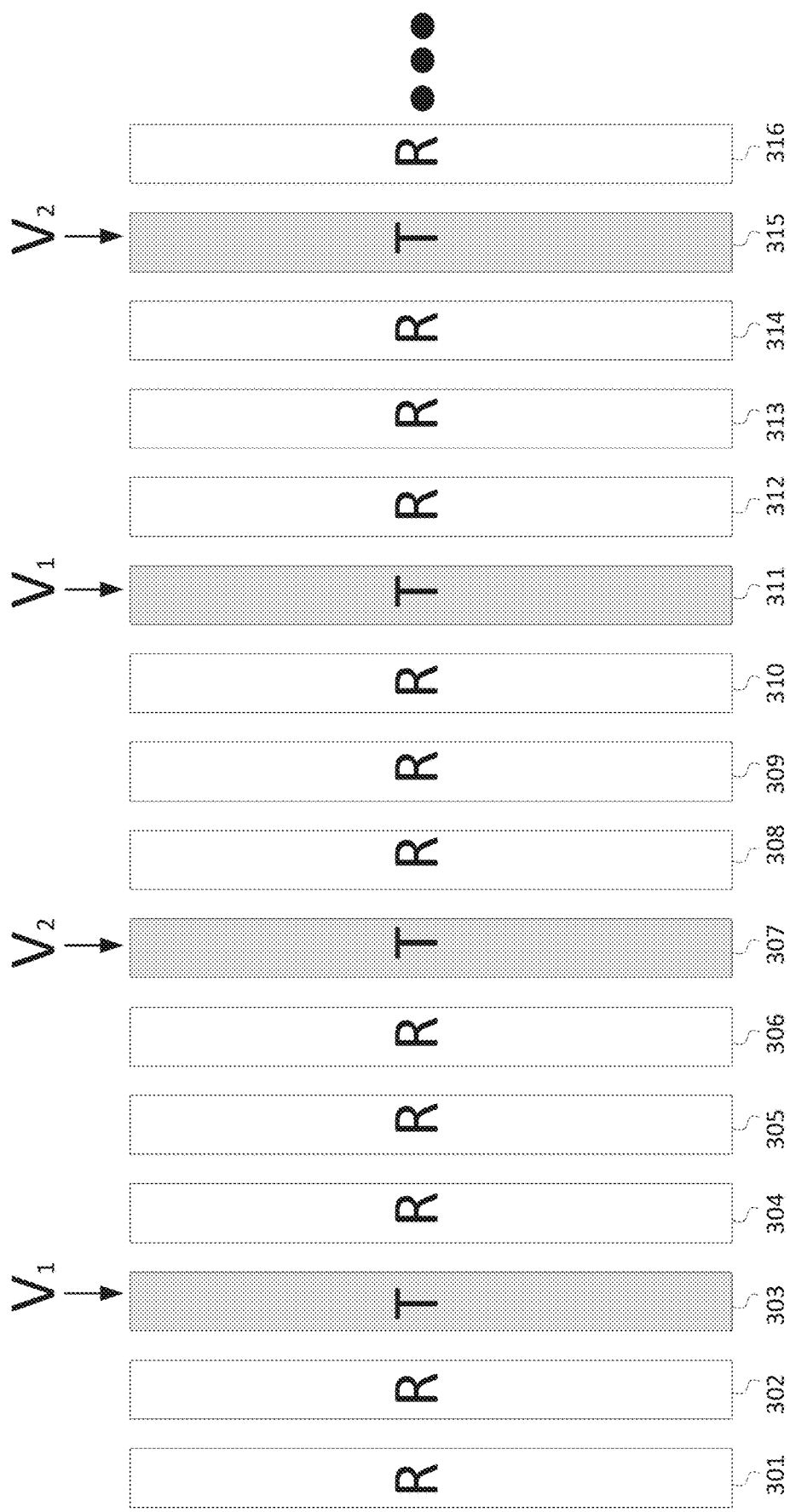

FIGS. 5A-5C depict driving schemes for a set of electrodes in accordance with additional exemplary embodiments of the present disclosure. The driving schemes shown in FIGS. 5A-5C provide for being able to determine nearest-neighbor capacitances, second-nearest-neighbor capacitances, and third-nearest-neighbor capacitances for all of the electrodes in a set of parallel electrodes through three respective scans with only two basis functions being used. For example, for a given electrode, electrode 308, the driving scheme in FIG. 5A provides capacitance information relative to electrodes 309 and 305, the driving scheme in FIG. 5B provides capacitance information for electrode 308 relative to electrodes 310 and 306, and the driving scheme in FIG. 5C provides capacitance information for electrode 308 relative to electrodes 311 and 307, thereby providing capacitance information for nearest neighbors on both sides of electrode 308, second-nearest-neighbors on both sides of electrode 308, and third-nearest neighbors on both sides of electrode 308.

It will be appreciated that the principles of the present disclosure are not limited to the foregoing examples depicted in FIGS. 3, 4A-4E and 5A-5C. Rather, according to the discussion above, it can be seen that a scanning process can be flexibly configured based on the following parameters:

Number of scans (each scan having a respective driving scheme)

Number of basis functions used per scan (and corresponding order parameter of the basis functions)

Arrangement of electrodes per scan (including the number of electrodes operated as transmitter electrodes and how the basis functions are distributed over the transmitter electrodes)

The number of scans used, the number of basis functions used per scan, and the arrangement of electrodes per scan are interrelated with regard to the information that is to be obtained from the overall scanning process. For example, in order to obtain nearest-neighbor capacitances nearest-neighbor capacitances, second-nearest-neighbor capacitances, and third-nearest-neighbor capacitances for all of the electrodes in a set of parallel electrodes, the scanning process may be set up with more scans and less basis functions (e.g., three scans using two basis functions per scan as shown in FIGS. 5A-5C), or may be set up with less scans and more basis functions (e.g., two scans using four basis functions per scan as shown in FIGS. 4D-4E, or two scans using six basis functions per scan as shown in FIGS. 4A-4B).

Using a relatively larger number of scans would either decrease the overall framerate associated with the corresponding sensing operation or lower the amount of averaging operations (and/or other filtering operations) to be performed. In many exemplary embodiments, it is advantageous to use a relatively lower number of scans to avoid movement-related artifacts and minimize scan time—for example, using two scans instead of three scans, or even using only a single scan in certain applications (such as for proximity sensing or object detection).

Using a smaller or larger number of basis functions comes with certain tradeoffs, as well as using a smaller or larger order parameter. It will be appreciated that using a larger number of basis functions means a correspondingly larger order parameter may be required, as the order parameter, at a minimum, should be at least as large as the number of basis functions (e.g., in the case of two basis functions being used, the order parameter is greater than or equal to two, in the case of four basis functions being used, the order parameter is greater than or equal to four, etc.). As discussed above, the larger the order parameter, the greater the noise reduction that may be achieved, but larger order parameters also introduce greater complexity and may require a longer period T (thereby increasing scan time and lowering framerate and/or allowing for less filtration operations). Additionally, as also discussed above, by using a larger number of basis functions, less interference from far-off electrodes which share a basis function may be achieved, but using a larger number of basis functions may introduce greater complexity in setting up the driving signals and processing the resulting signals.

Operating a greater proportion of electrodes as transmitter electrodes (up to a total of half of the set of electrodes being transmitter electrodes) may allow for less scans to be performed but may correspondingly require a greater number of basis functions to be used for a respective desired result (compare, for example, the 3-scan process of FIGS. 5A-5C versus the 2-scan process of FIGS. 4A-4B or FIGS. 4D-4E for obtaining nearest-neighbor capacitances, second-nearest-neighbor capacitances, and third-nearest-neighbor capacitances).

The arrangement of the transmitter electrodes and the basis functions for each scan may be flexibly configured based on the desired information to be obtained. For example, in an embodiment where nearest-neighbor capacitances and third-nearest-neighbor capacitances are desired but second-nearest-neighbor capacitances do not need to be determined, it may be possible to perform a single scan in a "TRTR . . . " alternating configuration using four or six basis functions as shown in FIG. 4D or 4A. In another implementation where nearest-neighbor capacitances, second-nearest-neighbor capacitances and third-nearest-neighbor capacitances are all desired, two scans may be performed in accordance with FIGS. 4A-4B or FIGS. 4D-4E. Further, it will be appreciated that the scans can be performed in any order or in other configurations. For example, a scan in accordance with the driving scheme of FIG. 4E may first be performed to obtain second-nearest neighbor capacitances and third-nearest neighbor capacitances, followed by a scan in accordance with the driving scheme of FIG. 4D being performed to obtain nearest-neighbor capacitances. In another example, a scan in accordance with the driving scheme of FIG. 4D is first performed to obtain nearest-neighbor capacitances and third-nearest neighbor capacitances, and a modified version of the driving scheme of FIG. 4E is performed to obtain second-nearest-neighbor capacitances (such as using a "TRRT . . . " repeating pattern, a "RRTT . . . " repeating pattern, or a "RTTR . . . " repeating pattern with four basis functions, instead of the "TTRR . . . " repeating pattern shown in FIG. 4E).

Exemplary embodiments of the present disclosure apply to capacitive sensors having one or more sets of non-intersecting electrodes, wherein each respective set of non-intersecting electrodes is adjacent to one another arranged according to a certain orientation or axis. Each respective set of nonintersecting electrodes may be parallel and/or may include rectangular electrodes and/or may be arranged in a same device layer. In the exemplary arrangement shown in FIGS. 2A-2B, a first set of parallel rectangular electrodes arranged in one device layer is vertically oriented, and a second set of parallel rectangular electrodes arranged in another device layer is horizontally oriented. The exemplary driving schemes discussed above in connection with FIGS. 3, 4A-4E and 5A-5C may be applied, for example, to either the first set of electrodes or the second set of electrodes while the other set of electrodes is not used. The unused set of electrodes may, for example, be floated, or may be grounded to provide for shielding (e.g., if a top layer is being scanned and a lower layer is grounded).

In some exemplary embodiments, it may be sufficient to determine capacitance information with respect to only one orientation. In such embodiments, it may be sufficient to perform a single scan or a single set of scans (e.g., in accordance with one or more of FIGS. 3, 4A-4E and 5A-5C) with respect to one set of electrodes corresponding to one orientation. For example, with respect to the exemplary arrangement shown in FIGS. 2A-2B, a single scan or a single set of scans may be performed with respect to the set of vertical electrodes only. Corresponding resulting signals are then obtained by the processing system with respect to capacitances between electrodes of the set of electrodes corresponding to the one orientation.

In some exemplary embodiments, it may be desirable to determine capacitance information with respect to multiple orientations. In such embodiments, a first scan or set of scans (e.g., in accordance with one or more of FIGS. 3, 4A-4E and 5A-5C) may be performed with respect to one set of electrodes corresponding to a first orientation, followed by a second scan or set of scans (e.g., in accordance with one or more of FIGS. 3, 4A-4E and 5A-5C being similarly applied to electrodes of a different orientation) being performed with respect to another set of electrodes corresponding to a second orientation. For example, with respect to the exemplary arrangement shown in FIGS. 2A-2B, a first scan or set of scans may be performed with respect to the set of vertical electrodes only, followed by a second scan or set of scans being be performed with respect to the set of horizontal electrodes only. Resulting signals would thus be obtainable by the processing system with respect to capacitance information in both the first and second orientations.

Figure 6:
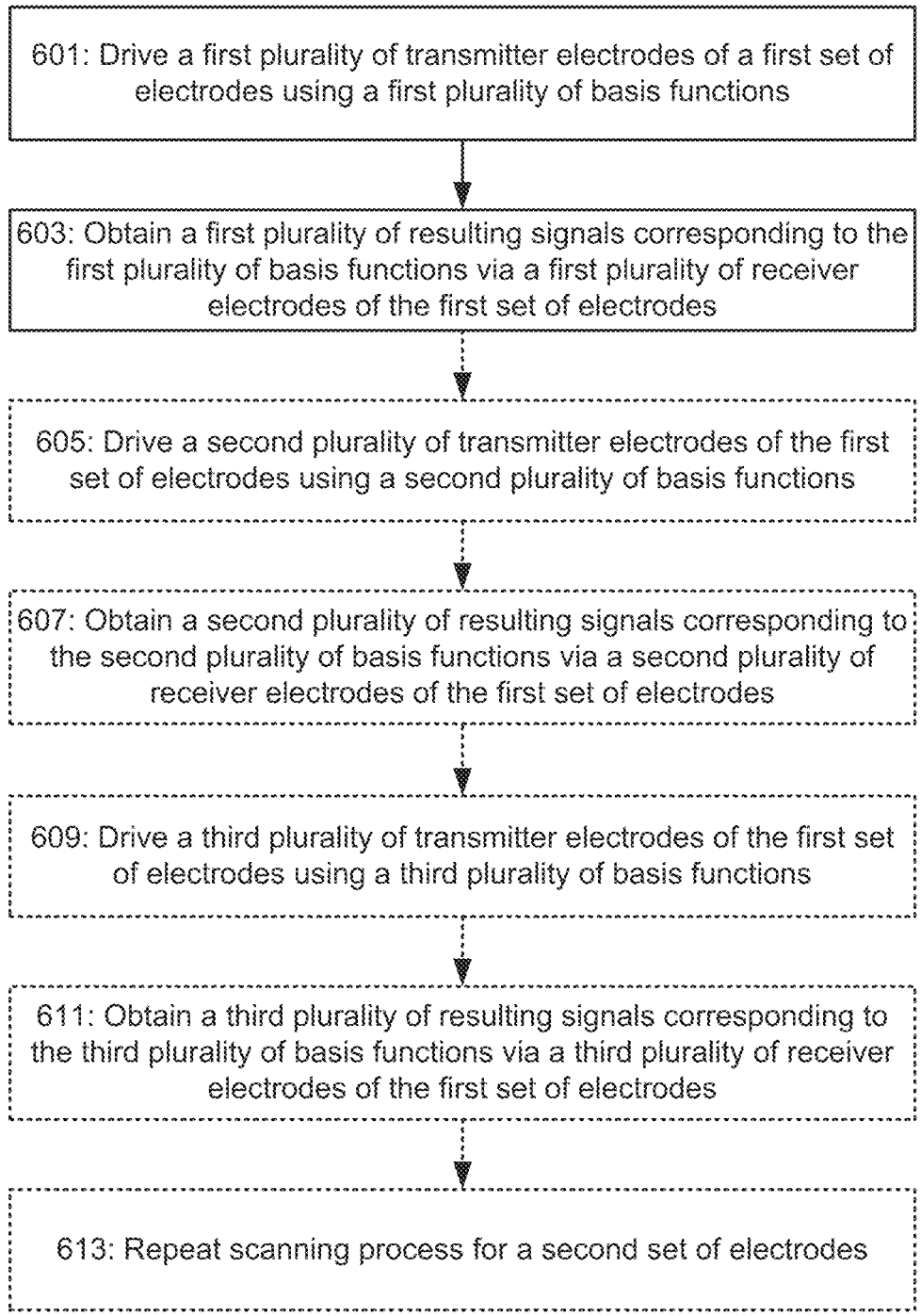
FIG. 6 depicts an exemplary flowchart for a scanning procedure according to exemplary embodiments of the present disclosure.

FIG. 6 depicts an exemplary flowchart for a scanning procedure according to exemplary embodiments of the present disclosure. Stages 601 and 603, and optionally stages 605, 607, 609 and 611, correspond to a first scan, or optionally a set of scans, being performed with respect to a first set of electrodes.

At stage 601, a processing system connected to a plurality of sensor electrodes operates a first plurality of electrodes of a first set of electrodes (i.e., a first set of non-intersecting electrodes adjacent to one another and arranged according to a certain orientation or axis) as transmitter electrodes by driving the first plurality of electrodes using a first plurality of basis functions. Examples of stage 601 include, for example, the driving schemes depicted in FIGS. 3, 4A, 4D and 5A. Driving the first plurality of electrodes using the first plurality of basis functions may include applying a sequence of basis functions to the transmitter electrodes in a repeating manner, such that for example, with four basis functions, a first basis function is applied to first, fifth, ninth, etc. transmitter electrodes in a sequence of transmitter electrodes, a second basis function is applied to second, sixth, tenth, etc. transmitter electrodes in the sequence of transmitter electrodes, a third basis function is applied to third, seventh, eleventh, etc. transmitter electrodes in the sequence of transmitter electrodes, and a fourth basis function is applied to fourth, eighth, twelfth, etc. transmitter electrodes in the sequence of transmitter electrodes.

At stage 603, the processing system obtains, via a first plurality of receiver electrodes of the first set of electrodes, a first plurality of resulting signals corresponding to the first plurality of basis functions which are driven onto the first plurality of transmitter electrodes. The resulting signals for a respective receiver provide information as to a detected capacitance between the respective receiver and a transmitter electrode driven with a respective basis function, which allows the processing system to determine capacitances between pairs of electrodes. The determined capacitances corresponding to the first plurality of resulting signals may include, for example, determined capacitances for nearest-neighbor pairs of electrodes, determined capacitances for second-nearest-neighbor pairs of electrodes, and/or determined capacitances for third-nearest-neighbor pairs of electrodes. For example, if the driving scheme used in stage 601 corresponds to FIG. 4A or FIG. 4D, the resulting signals obtained in stage 603 may provide capacitance information for all nearest-neighbor pairs of electrodes and all third-nearest-neighbor pairs of electrodes, but would not include any capacitance information for second-nearest-neighbor pairs of electrodes. In another example, if the driving scheme used in stage 601 corresponds to FIG. 5A, the resulting signals obtained in stage 603 may provide capacitance information for some (but not all) nearest-neighbor pairs of electrodes, some (but not all) second-nearest-neighbor pairs of electrodes, and some (but not all) third-nearest-neighbor pairs of electrodes.

In some exemplary embodiments, the scanning process of FIG. 6 may end once stage 603 is completed (for example, in embodiments where only one set of electrodes is scanned and only one scan for that set of electrodes is performed, such as in certain proximity sensing or object detection applications). In other exemplary embodiments, one or more additional scans may be performed (for example, a second scan in accordance with stages 605 and 607, and/or a third scan in accordance with stages 609 and 611). Additionally, in some exemplary embodiments, the scanning process of FIG. 6 with respect to stages 601-603, with respect to stages 601-607, or with respect to stages 601-611 may be repeated at stage 613 with a second set of electrodes (i.e., a second set of non-intersecting electrodes adjacent to one another and arranged according to a certain orientation or axis which is different from the orientation or axis of the first set of non-intersecting electrodes).

At stage 605, the processing system operates a second plurality of electrodes of the first set of electrodes as transmitter electrodes by driving the second plurality of electrodes using a second plurality of basis functions. Examples of stage 605 include, for example, the driving schemes depicted in FIGS. 4B, 4E and 5B. The second plurality of transmitter electrodes of stage 605 is different from the first plurality of transmitter electrodes of stage 601, but may include some overlap (e.g., compare FIG. 4A to FIG. 4B, where electrode 301 is a transmitter electrode in both driving schemes but electrode 302 is a transmitter electrode in FIG. 4B but not FIG. 4A). The second plurality of basis functions may be the same set of basis functions as used in stage 601, except that they are applied to a different set of electrodes, or the second plurality of basis functions may be different from the set of basis functions used in stage 601 (for example, using a different number of basis functions, a different order for the basis functions, or a different type of basis function).

At stage 607, the processing system obtains, via a second plurality of receiver electrodes of the first set of electrodes, a second plurality of resulting signals corresponding to the second plurality of basis functions which are driven onto the second plurality of transmitter electrodes. The second plurality of receiver electrodes of stage 607 is different from the first plurality of transmitter electrodes of stage 603, but may include some overlap. The determined capacitances corresponding to the second plurality of resulting signals may include, for example, determined capacitances for nearest-neighbor pairs of electrodes, determined capacitances for second-nearest-neighbor pairs of electrodes, and/or determined capacitances for third-nearest-neighbor pairs of electrodes. For example, if the driving scheme used in stage 605 corresponds to FIG. 4B or FIG. 4E, the resulting signals obtained in stage 607 may provide capacitance information for some (but not all) nearest-neighbor pairs of electrodes, all second-nearest-neighbor pairs of electrodes, and some (but not all) third-nearest-neighbor pairs of electrodes. In another example, if the driving scheme used in stage 605 corresponds to FIG. 5B, the resulting signals obtained in stage 607 may provide capacitance information for some (but not all) nearest-neighbor pairs of electrodes, some (but not all) second-nearest-neighbor pairs of electrodes, and some (but not all) third-nearest-neighbor pairs of electrodes.

At stage 609, the processing system operates a third plurality of electrodes of the first set of electrodes as transmitter electrodes by driving the third plurality of electrodes using a third plurality of basis functions. Examples of stage 609 include, for example, the driving schemes depicted in FIGS. 4C and 5C. The third plurality of transmitter electrodes of stage 609 is different from the first plurality of transmitter electrodes of stage 601 and from the second plurality of transmitter electrodes of stage 605, but may include some overlap. The third plurality of basis functions may be the same set of basis functions as used in stage 601 and/or stage 605, except that they are applied to a different set of electrodes, or the third plurality of basis functions may be different from the set of basis functions used in stage 601 and/or in stage 605 (for example, using a different number of basis functions, a different order for the basis functions, or a different type of basis function).

At stage 611, the processing system obtains, via a third plurality of receiver electrodes of the first set of electrodes, a third plurality of resulting signals corresponding to the third plurality of basis functions which are driven onto the third plurality of transmitter electrodes. The third plurality of receiver electrodes of stage 611 is different from the first plurality of transmitter electrodes of stage 603 and the second plurality of transmitter electrodes of stage 607, but may include some overlap. The determined capacitances corresponding to the third plurality of resulting signals may include, for example, determined capacitances for nearest-neighbor pairs of electrodes, determined capacitances for second-nearest-neighbor pairs of electrodes, determined capacitances for third-nearest-neighbor pairs of electrodes, and/or determined capacitances for fourth-nearest-neighbor pairs of electrodes. For example, if the driving scheme used in stage 609 corresponds to FIG. 4C, the resulting signals obtained in stage 607 may provide capacitance information for some (but not all) nearest-neighbor pairs of electrodes, some (but not all) second-nearest-neighbor pairs of electrodes, some (but not all) third-nearest-neighbor pairs of electrodes, and all fourth-nearest-neighbor pairs of electrodes. In another example, if the driving scheme used in stage 609 corresponds to FIG. 5C, the resulting signals obtained in stage 611 may provide capacitance information for some (but not all) nearest-neighbor pairs of electrodes, some (but not all) second-nearest-neighbor pairs of electrodes, and some (but not all) third-nearest-neighbor pairs of electrodes.

At stage 613, the foregoing operations discussed above with regard to stages 601 and 603 (as well as optionally stages 605, 607, 609 and 611) may be repeated for a second set of non-intersecting electrodes. For example, referring back to FIG. 2B, if stages 601 through 611 are first performed with regard to vertical electrodes 211-219, then at stage 613, stages 601 through 611 may be repeated for horizontal electrodes 221-229.

As discussed above, exemplary embodiments of the process depicted in FIG. 6 may be used in a variety of applications, including touch sensing, proximity sensing (such as face detection), object detection, LGM correction, moisture sensing, and in other situations where the profiles obtained with the sensing scheme in exemplary embodiments of the present application can replace absolute capacitive measurements. The processes and driving schemes discussed herein are able to achieve various advantages relative to conventional capacitive sensing systems with respect to noise reduction and improving SNR, and are advantageous over conventional absolute measurements which sometimes suffer from poor SNR due to very large background capacitances.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. It is understood that skilled artisans are able to employ such variations as appropriate, and the invention may be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for capacitive sensing, comprising:
   driving, by a processing system, a first plurality of transmitter electrodes using a first plurality of basis functions, wherein the first plurality of transmitter electrodes are part of a first set of non-intersecting electrodes which are arranged adjacently to one another in a first orientation; and
   obtaining, by the processing system, via a first plurality of receiver electrodes of the first set of non-intersecting electrodes, a first plurality of resulting signals corresponding to the first plurality of basis functions driven onto the first plurality of transmitter electrodes, wherein the first plurality of resulting signals includes capacitance information for pairs of electrodes of the first set of non-intersecting electrodes, wherein the capacitance information includes at least two of:
      capacitance information for nearest-neighbor pairs of electrodes of the first set of non-intersecting electrodes;
      capacitance information for second nearest-neighbor pairs of electrodes of the first set of non-intersecting electrodes; or
      capacitance information for third nearest-neighbor pairs of electrodes of the first set of non-intersecting electrodes;
   wherein obtaining the first plurality of resulting signals corresponding to the first plurality of basis functions driven onto the first plurality of transmitter electrodes includes: obtaining, via a first receiver electrode, first resulting signals which correspond to both a first basis function of the first plurality of basis functions driven onto a first transmitter electrode of the first plurality of transmitter electrodes and a second basis function driven onto a second transmitter electrode of the first plurality of transmitter electrodes;
   wherein the method further comprises: distinguishing, by the processing system based on the obtained first resulting signals, between: (a) a first capacitive coupling between the first receiver electrode and the first transmitter electrode corresponding to the first basis function, and (b) a second capacitive coupling between the first receiver electrode and the second transmitter electrode corresponding to the second basis function.

2. The method according to claim 1, further comprising:
driving, by the processing system, a second plurality of transmitter electrodes of the first set of non-intersecting electrodes using a second plurality of basis functions; and
obtaining, by the processing system, via a second plurality of receiver electrodes of the first set of non-intersecting electrodes, a second plurality of resulting signals corresponding to the second plurality of basis functions driven onto the second plurality of transmitter electrodes, wherein the second plurality of resulting signals include additional capacitance information for additional pairs of electrodes of the first set of non-intersecting electrodes which was not obtained via the first plurality of resulting signals.

3. The method according to claim 2, wherein the second plurality of basis functions is the same as the first plurality of basis functions.

4. The method according to claim 2, wherein the first plurality of resulting signals and the second plurality of resulting signals include at least two of the following:
capacitance information for all nearest-neighbor pairs of electrodes of the first set of non-intersecting electrodes;
capacitance information for all second nearest-neighbor pairs of electrodes of the first set of non-intersecting electrodes; or
capacitance information for all third nearest-neighbor pairs of electrodes of the first set of non-intersecting electrodes.

5. The method according to claim 1, wherein electrodes of the first set of non-intersecting electrodes are parallel to one another.

6. The method according to claim 1, wherein the first plurality of basis functions are Walsh-Hadamard basis functions.

7. The method according to claim 1, further comprising:
driving, by the processing system, a first plurality of transmitter electrodes of a second set of non-intersecting electrodes using a second plurality of basis functions, wherein the second set of non-intersecting electrodes are arranged adjacently to one another in a second orientation; and
obtaining, by the processing system, via a first plurality of receiver electrodes of the second set of non-intersecting electrodes, a second plurality of resulting signals corresponding to the second plurality of basis functions driven onto the first plurality of transmitter electrodes of the second set of non-intersecting electrodes, wherein the second plurality of resulting signals includes capacitance information for pairs of electrodes of the second set of non-intersecting electrodes, including at least one of:
capacitance information for nearest-neighbor pairs of electrodes of the second set of non-intersecting electrodes;
capacitance information for second nearest-neighbor pairs of electrodes of the second set of non-intersecting electrodes; or
capacitance information for third nearest-neighbor pairs of electrodes of the second set of non-intersecting electrodes.

8. A device for capacitive sensing, comprising:
a plurality of electrodes, including a first set of non-intersecting electrodes which are arranged adjacently to one another in a first orientation; and
a processing system, configured to:
drive a first plurality of transmitter electrodes of the first set of non-intersecting electrodes using a first plurality of basis functions; and
obtain, via a first plurality of receiver electrodes of the first set of non-intersecting electrodes, a first plurality of resulting signals corresponding to the first plurality of basis functions driven onto the first plurality of transmitter electrodes, wherein the first plurality of resulting signals includes capacitance information for pairs of electrodes of the first set of non-intersecting electrodes, wherein the capacitance information includes at least two of:
capacitance information for nearest-neighbor pairs of electrodes of the first set of non-intersecting electrodes;
capacitance information for second nearest-neighbor pairs of electrodes of the first set of non-intersecting electrodes; or
capacitance information for third nearest-neighbor pairs of electrodes of the first set of non-intersecting electrodes;
wherein obtaining the first plurality of resulting signals corresponding to the first plurality of basis functions driven onto the first plurality of transmitter electrodes includes: obtaining, via a first receiver electrode, first resulting signals which correspond to both a first basis function of the first plurality of basis functions driven onto a first transmitter electrode of the first plurality of transmitter electrodes and a second basis function driven onto a second transmitter electrode of the first plurality of transmitter electrodes;
wherein the processing system is further configured to: distinguish, based on the obtained first resulting signals, between: (a) a first capacitive coupling between the first receiver electrode and the first transmitter electrode corresponding to the first basis function, and (b) a second capacitive coupling between the first receiver electrode and the second transmitter electrode corresponding to the second basis function.

9. The device according to claim 8, wherein the processing system is further configured to:
drive a second plurality of transmitter electrodes of the first set of non-intersecting electrodes using a second plurality of basis functions; and
obtain, via a second plurality of receiver electrodes of the first set of non-intersecting electrodes, a second plurality of resulting signals corresponding to the second plurality of basis functions driven onto the second plurality of transmitter electrodes, wherein the second plurality of resulting signals include additional capacitance information for additional pairs of electrodes of the first set of non-intersecting electrodes which was not obtained via the first plurality of resulting signals.

10. The device according to claim 9, wherein the second plurality of basis functions is the same as the first plurality of basis functions.

11. The device according to claim 9, wherein the first plurality of resulting signals and the second plurality of resulting signals include at least two of the following:
capacitance information for all nearest-neighbor pairs of electrodes of the first set of non-intersecting electrodes;
capacitance information for all second nearest-neighbor pairs of electrodes of the first set of non-intersecting electrodes; or capacitance information for all third nearest-neighbor pairs of electrodes of the first set of non-intersecting electrodes.

12. The device according to claim 8, wherein electrodes of the first set of non-intersecting electrodes are parallel to one another.

13. The device according to claim 8, wherein the first plurality of basis functions are Walsh-Hadamard basis functions.

14. The device according to claim 8, wherein the device further comprises a second set of non-intersecting electrodes arranged adjacently to one another in a second orientation; and wherein the processing system is further configured to:
drive a first plurality of transmitter electrodes of the second set of non-intersecting electrodes using a second plurality of basis functions; and
obtain, via a first plurality of receiver electrodes of the second set of non-intersecting electrodes, a second plurality of resulting signals corresponding to the second plurality of basis functions driven onto the first plurality of transmitter electrodes of the second set of non-intersecting electrodes, wherein the second plurality of resulting signals includes capacitance information for pairs of electrodes of the second set of non-intersecting electrodes, including at least one of:
capacitance information for nearest-neighbor pairs of electrodes of the second set of electrodes;
capacitance information for second nearest-neighbor pairs of electrodes of the second set of electrodes; or
capacitance information for third nearest-neighbor pairs of electrodes of the second set of electrodes.

15. A non-transitory computer-readable medium having processor-executable instructions stored thereon for capacitive sensing, wherein the processor-executable instructions, when executed, facilitate:
driving a first plurality of transmitter electrodes using a first plurality of basis functions, wherein the first plurality of transmitter electrodes are part of a first set of non-intersecting electrodes which are arranged adjacently to one another in a first orientation; and
obtaining, via a first plurality of receiver electrodes of the first set of non-intersecting electrodes, a first plurality of resulting signals corresponding to the first plurality of basis functions driven onto the first plurality of transmitter electrodes, wherein the first plurality of resulting signals includes capacitance information for pairs of electrodes of the first set of non-intersecting electrodes, wherein the capacitance information includes at least two of:
capacitance information for nearest-neighbor pairs of electrodes of the first set of electrodes;
capacitance information for second nearest-neighbor pairs of electrodes of the first set of electrodes; or
capacitance information for third nearest-neighbor pairs of electrodes of the first set of electrodes;

wherein obtaining the first plurality of resulting signals corresponding to the first plurality of basis functions driven onto the first plurality of transmitter electrodes includes: obtaining, via a first receiver electrode, first resulting signals which correspond to both a first basis function of the first plurality of basis functions driven onto a first transmitter electrode of the first plurality of transmitter electrodes and a second basis function driven onto a second transmitter electrode of the first plurality of transmitter electrodes;
wherein the processor-executable instructions, when executed, further facilitate: distinguishing, based on the obtained first resulting signals, between: (a) a first capacitive coupling between the first receiver electrode and the first transmitter electrode corresponding to the first basis function, and (b) a second capacitive coupling between the first receiver electrode and the second transmitter electrode corresponding to the second basis function.

16. The non-transitory computer-readable medium according to claim 15, wherein the processor-executable instructions, when executed, further facilitate:
driving a second plurality of transmitter electrodes of the first set of non-intersecting electrodes using a second plurality of basis functions; and
obtaining, via a second plurality of receiver electrodes of the first set of non-intersecting electrodes, a second plurality of resulting signals corresponding to the second plurality of basis functions driven onto the second plurality of transmitter electrodes, wherein the second plurality of resulting signals include additional capacitance information for additional pairs of electrodes of the first set of non-intersecting electrodes which was not obtained via the first plurality of resulting signals.

17. The non-transitory computer-readable medium according to claim 16, wherein the second plurality of basis functions is the same as the first plurality of basis functions.

18. The non-transitory computer-readable medium according to claim 16, wherein the first plurality of resulting signals and the second plurality of resulting signals include at least two of the following:
capacitance information for all nearest-neighbor pairs of electrodes of the first set of non-intersecting electrodes;
capacitance information for all second nearest-neighbor pairs of electrodes of the first set of non-intersecting electrodes; or
capacitance information for all third nearest-neighbor pairs of electrodes of the first set of non-intersecting electrodes.

19. The non-transitory computer-readable medium according to claim 15, wherein electrodes of the first set of non-intersecting electrodes are parallel to one another.

20. The non-transitory computer-readable medium according to claim 15, wherein the first plurality of basis functions are Walsh-Hadamard basis functions.

* * * * *